(12) United States Patent
Sakhnini et al.

(10) Patent No.: US 11,765,756 B2
(45) Date of Patent: Sep. 19, 2023

(54) USER EQUIPMENT (UE) REQUESTED CONTROL RESOURCE SET (CORESET)/SEARCH SPACE (SS) SETS

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Juan Montojo, San Diego, CA (US); Wanshi Chen, San Diego, CA (US); Wooseok Nam, San Diego, CA (US); Mahmoud Taherzadeh Boroujeni, San Diego, CA (US); Linhai He, San Diego, CA (US); Hwan Joon Kwon, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/243,278

(22) Filed: Apr. 28, 2021

(65) Prior Publication Data

US 2021/0345342 A1 Nov. 4, 2021

Related U.S. Application Data

(60) Provisional application No. 63/018,461, filed on Apr. 30, 2020, provisional application No. 63/018,455,
(Continued)

(51) Int. Cl.
*H04W 72/04* (2023.01)
*H04W 72/14* (2009.01)
(Continued)

(52) U.S. Cl.
CPC .......... *H04W 72/53* (2023.01); *H04B 7/0695* (2013.01); *H04L 5/0051* (2013.01);
(Continued)

(58) Field of Classification Search
CPC .......... H04W 72/0493; H04W 72/042; H04W 72/0453; H04W 72/14; H04W 74/0833;
(Continued)

(56) References Cited

U.S. PATENT DOCUMENTS

2019/0190582 A1* 6/2019 Guo .................... H04L 27/2607
2019/0253308 A1* 8/2019 Huang ................. H04B 7/0695
(Continued)

FOREIGN PATENT DOCUMENTS

WO 2020069135 A2 4/2020

OTHER PUBLICATIONS

Apple Inc: "UE Power Saving Techniques", 3GPP Draft, 3GPP TSG-RAN WG1 Meeting #96, R1-1902771, Power Saving Techniques Based on UE Adaptation, 3rd Generation Partnership Project (3GPP), Athens, Greece, Feb. 25-Mar. 1, 2019 pp. 1-15, Retrieved from the Internet: URL: http://www.3gpp.org/ftp/tsg%5Fran/WG1%5FRL1/TSGR1%5F96/Docs/R1%2D1902771%2Ezip [retrieved on Feb. 16, 2019.
(Continued)

*Primary Examiner* — Candal Elpenord
(74) *Attorney, Agent, or Firm* — Seyfarth Shaw LLP

(57) ABSTRACT

A method of wireless communications by a user equipment (UE) includes transmitting a request for action for at least one control resource set (CORESET) and associated search space. The action may include configuring, activating, and/or deactivating the at least one CORESET and associated search space. The CORESET may be a dynamic CORESET with a predefined number of search space occasions or a semi-static CORESET. The method also includes commu-
(Continued)

nicating in accordance with the request. The request is transmitted using at least one of an uplink radio resource control (RRC) message, a physical uplink control channel (PUCCH), a sounding reference signal (SRS), a random access channel (RACH), or a physical uplink shared channel (PUSCH). The UE may switch, in connection with the request, to a bandwidth part (BWP) configured for the UE.

4 Claims, 13 Drawing Sheets

Related U.S. Application Data filed on Apr. 30, 2020, provisional application No. 63/017,548, filed on Apr. 29, 2020.

(51) Int. Cl.
| | | |
|---|---|---|
| *H04W 74/08* | (2009.01) | |
| *H04B 7/06* | (2006.01) | |
| *H04L 25/02* | (2006.01) | |
| *H04L 5/00* | (2006.01) | |
| *H04W 72/53* | (2023.01) | |
| *H04W 72/0453* | (2023.01) | |
| *H04W 72/23* | (2023.01) | |

(52) U.S. Cl.
CPC ..... *H04L 25/0226* (2013.01); *H04W 72/0453* (2013.01); *H04W 72/23* (2023.01); *H04W 74/0833* (2013.01)

(58) Field of Classification Search
CPC .... H04W 72/53; H04W 72/23; H04B 7/0695; H04L 5/0051; H04L 5/0094; H04L 5/0053; H04L 5/001; H04L 25/0226
USPC .................................................. 370/329–330
See application file for complete search history.

(56) References Cited

U.S. PATENT DOCUMENTS

| | | | |
|---|---|---|---|
| 2019/0305867 A1* | 10/2019 | Tseng | H04W 72/042 |
| 2020/0029315 A1 | 1/2020 | Lin et al. | |
| 2020/0195410 A1* | 6/2020 | Li | H04L 1/1819 |
| 2020/0314811 A1* | 10/2020 | Lin | H04L 5/0053 |
| 2021/0051710 A1 | 2/2021 | Cirik et al. | |
| 2021/0099254 A1* | 4/2021 | Babaei | H04L 1/1896 |
| 2021/0274535 A1* | 9/2021 | Yi | H04L 5/0032 |
| 2022/0141856 A1* | 5/2022 | Xia | H04W 72/1268 |
| | | | 370/329 |

OTHER PUBLICATIONS

Ericsson: "Adaptation Aspects of NR UE Power Saving," 3GPP Draft, 3GPP TSG-RAN WG1 Meeting AH-1901, R1-1901166, Adaptation Aspects of NR UE Power Saving, 3rd Generation Partnership Project (3GPP), Taipei, Taiwan, Jan. 21-25, 2019, 9 pages, Retrieved from the Internet: URL: http://www.3gpp.org/ftp/Meetings%5F3GPP%5FSYNC/RAN1/Docs/R1%2D1901166%2Ezip [retrieved on Jan. 20, 2019].

International Search Report and Written Opinion—PCT/US2021/029972—ISA/EPO—dated Sep. 17, 2021.

Qualcomm Incorporated: "PDCCH Monitoring Reduction and Power Saving for RedCap Devices," 3GPP Draft, 3GPP TSG RAN WG1 #103-e, R1-2008621, 3rd Generation Partnership Project (3GPP), e-Meeting, Oct. 26, 2020-Nov. 13, 2020, pp. 1-14, Retrieved from the Internet: URL: https://ftp.3gpp.org/tsg_ran/WG1_RL1/TSGR1_103-e/Docs/R1-2008621.zip R1-2008621 PDCCH Monitoring Reduction and Power Saving for RedCap Devices.docx [retrieved on Oct. 17, 2020].

Samsung: "PDCCH-Based PowerSaving Signal/Channel", 3GPP Draft, 3GPP TSG RAN WG1 #97, R1-1906980, On PDCCH-Based Power Saving Signal, 3rd Generation Partnership Project (3GPP), Reno, USA, May 13-17, 2019, 12 Pages, Retrieved from the Internet: URL: http://www.3gpp.org/ftp/Meetings%5F3GPP%5FSYNC/RAN1/Docs/ R1%2D1906980%2Ezip [retrieved on May 13, 2019].

* cited by examiner

USER EQUIPMENT (UE) REQUESTED CONTROL RESOURCE SET (CORESET)/SEARCH SPACE (SS) SETS

CROSS-REFERENCE TO RELATED APPLICATIONS

The present application claims the benefit of U.S. Provisional Patent Application No. 63/017,548, filed on Apr. 29, 2020, and titled "USER EQUIPMENT (UE) REQUESTED CONTROL RESOURCE SET (CORESET)/SEARCH SPACE (SS) SETS," U.S. Provisional Patent Application No. 63/018,455, filed on Apr. 30, 2020, and titled "UPLINK MESSAGE FOR REQUESTING CORESET AND SEARCH SPACE SET FOR A USER EQUIPMENT," and U.S. Provisional Patent Application No. 63/018,461, filed on Apr. 30, 2020, and titled "IMPLICIT BANDWIDTH PART SWITCH USING USER EQUIPMENT REQUESTED CONTROL RESOURCE SET OR SEARCH SPACE SETS," the disclosures of which are expressly incorporated by reference in their entireties.

FIELD OF THE DISCLOSURE

Aspects of the present disclosure generally relate to wireless communications, and more particularly to techniques and apparatuses related to control resource set (CORESET)/search space (SS) sets.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method of wireless communications by a user equipment (UE) includes transmitting a request for action for one or more control resource sets (CORESETs) and associated search space. The action includes configuring, activating, and/or deactivating the CORESET(s) and associated search space. The CORESET may be a dynamic CORESET with a predefined number of search space occasions or a semi-static CORESET. The method also includes communicating in accordance with the request.

In other aspects of the present disclosure, an apparatus for wireless communications at a user equipment (UE) includes a processor, memory coupled with the processor, and instructions stored in the memory and operable, when executed by the processor, to cause the apparatus to transmit a request for action for at least one control resource set (CORESET) and associated search space. The action may include configuring, activating, and/or deactivating the at least one CORESET and associated search space. The CORESET may be a dynamic CORESET with a predefined number of search space occasions or a semi-static CORESET. The apparatus will also communicate in accordance with the request.

In still other aspects of the present disclosure, the UE includes means for transmitting a request for action for at least one control resource set (CORESET) and associated search space. The action may include configuring, activating, and/or deactivating the at least one CORESET and associated search space. The CORESET may be a dynamic CORESET with a predefined number of search space occasions or a semi-static CORESET. The UE also includes means for communicating in accordance with the request.

In further aspects of the present disclosure, a non-transitory computer-readable medium with program code recorded thereon is disclosed. The program code is executed by a UE and includes program code to transmit a request for action for at least one control resource set (CORESET) and associated search space. The action may include configuring, activating, and/or deactivating the at least one CORESET and associated search space. The CORESET may be a dynamic CORESET with a predefined number of search space occasions or a semi-static CORESET. The UE also includes program code to communicate in accordance with the request.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
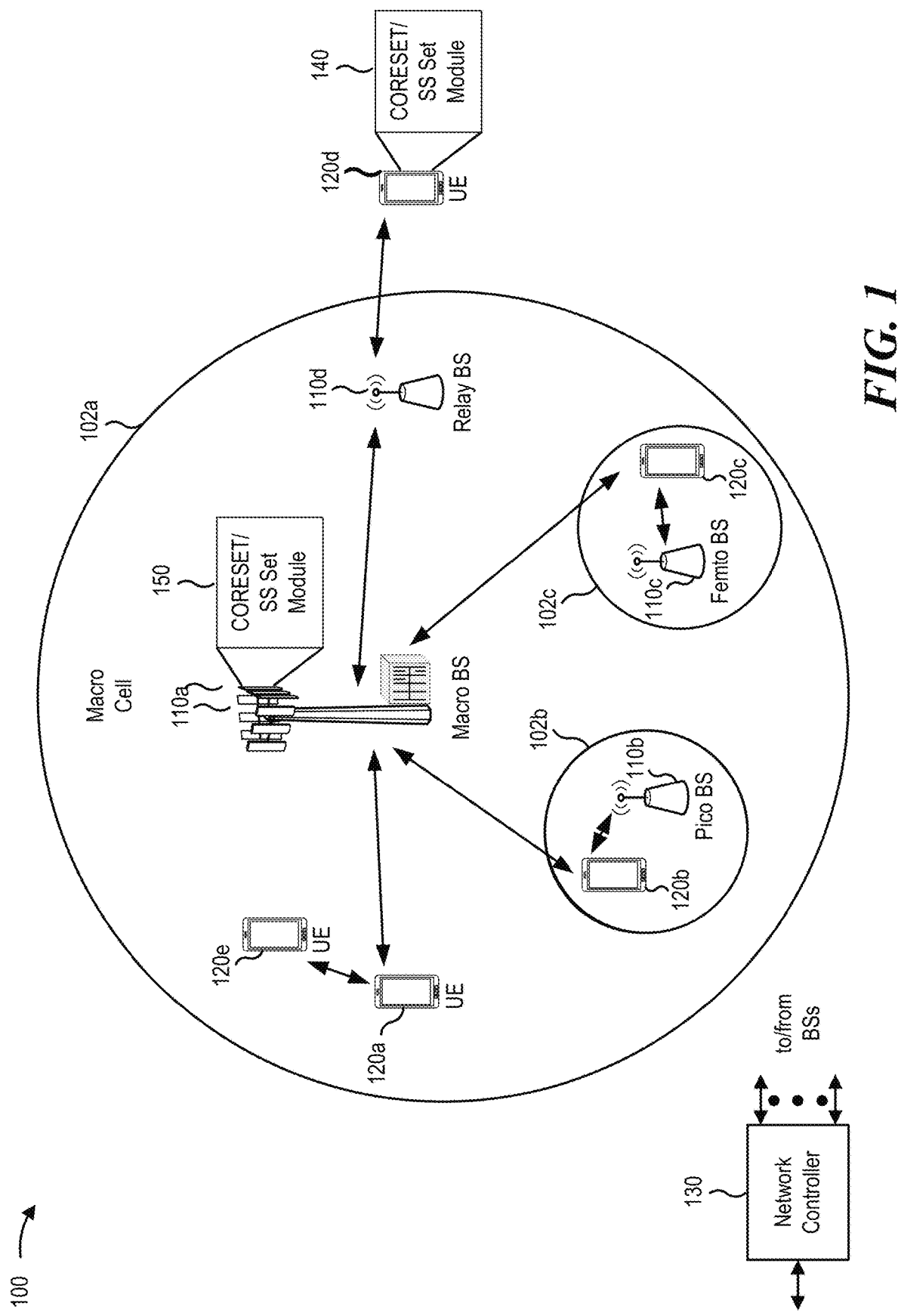
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Sparsely configured search spaces may be appropriate for some UEs, such as reduced capability NR devices, where power savings and battery lifetime enhancements are objectives. These reduced capability NR devices may have tolerance for large latency and may also be uplink heavy. However, uplink traffic may not always be present. To enable uplink traffic, dynamic uplink grants specify the network (e.g., base station or gNB) to configure a UE with periodic control resource set (CORESET)/SS (search space) sets. There may be a need to reduce unnecessary downlink (DL) traffic. For example, reducing physical downlink control channel (PDCCH) monitoring occasions for a reduced capacity UE reduces UE power consumption, and leaves more resources for uplink traffic. This may be particularly useful when uplink heavy traffic patterns are expected.

To address the need for additional CORESETs in sparsely configured search spaces, aspects of the present disclosure define UE requests for one or more CORESET/search space set(s). The requests are for actions such as configuring the CORESETs, activating the CORESETs, and/or deactivating the CORESETs. The CORESETs may be regular or dynamic CORESETs.

As noted, a user equipment (UE) may request one or more control resource set (CORESET) and/or search space (SS) set(s) configured for the UE to be changed (e.g., activated, deactivated, configured, modified, etc.). For example, a UE may be configured with a CORESET(s)/SS set(s) having a longer periodicity (e.g., sparse in time), where the UE does not monitor for PDCCH in the time between scheduled CORESET(s)/SS set(s). When data is to be transmitted by the UE during this non-monitoring period, the UE may send a message to the base station with a request about CORESET(s)/SS set(s). In some aspects, the request may reference one or more CORESET and/or one or more SS set(s) that the base station previously configured for the UE. The UE may send the request through a scheduling request (SR), random access channel (RACH) and/or radio resource control (RRC) signaling, etc.

Based on the UE's request, the base station my reconfigure the UE with new and/or modified CORESET(s)/SS set(s) in a new BWP, and the UE may switch to the new BWP that comprises the new and/or modified CORESET(s)/SS set(s). Such dynamic or on-demand configuration enables CORESET(s)/SS set(s) to be scheduled for the UE based at least in part on the uplink traffic.

Aspects of the present disclosure provide an implicit BWP switch based on the UE's request for the new or modified CORESET(s)/SS set(s). For example, the UE's request for CORESET(s)/SS set(s) may be regarded by the network as an implicit BWP switch request from the UE. As there may be a one to one mapping for each CORESET ID and/or SS ID to each BWP per configuration, based on the requested CORESET ID and/or SS ID, the network (e.g., the base station) may assume the UE is implicitly requesting BWP switching. Thus, after the UE requests new or modified CORESET(s)/SS set(s) configuration, the UE may switch to the corresponding BWP for monitoring the PDCCH of the requested CORESET ID and/or SS ID.

The request may include one or more parameters for the CORESET or the SS set that may include an aggregation level, a physical downlink control channel (PDCCH) candidate, a number of PDCCH candidates, a transmission configuration indicator (TCI) state for the PDCCH, or one or more repetitions for the PDCCH. Such dynamic or on-demand configuration enables CORESET(s)/SS set(s) to be scheduled for the UE based at least in part on the uplink traffic.

FIG. 1 is a block diagram conceptually illustrating an example of a wireless communications network 100, in accordance with various aspects of the present disclosure. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another (e.g., directly or indirectly via a wireless or wireline backhaul).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

In certain aspects, the base station 110 may include a CORESET/SS set module 150 configured to receive a request from a UE to change a control resource set (CORESET) and/or a search space (SS) set. The request may be received using an uplink radio resource control (RRC) message, a physical uplink control channel (PUCCH), a sounding reference signal (SRS), a random access channel (RACH), and/or a physical uplink shared channel (PUSCH). The CORESET/SS set module 150 may also be configured to transmit downlink signaling to the UE using the CORESET and/or the SS set.

The UE 120 may include a CORESET/SS set module 140 configured to transmit a request for action for at least one control resource set (CORESET) and associated search space, and communicate in accordance with the request. The action may include configuring, activating, and/or deactivating the CORESET(s) and associated search space. The CORESET may be a dynamic CORESET with a predefined number of search space occasions or a semi-static CORESET.

As indicated above, FIG. 1 is provided merely as an example. Other examples may differ from what is described with regard to FIG. 1.

Figure 2:
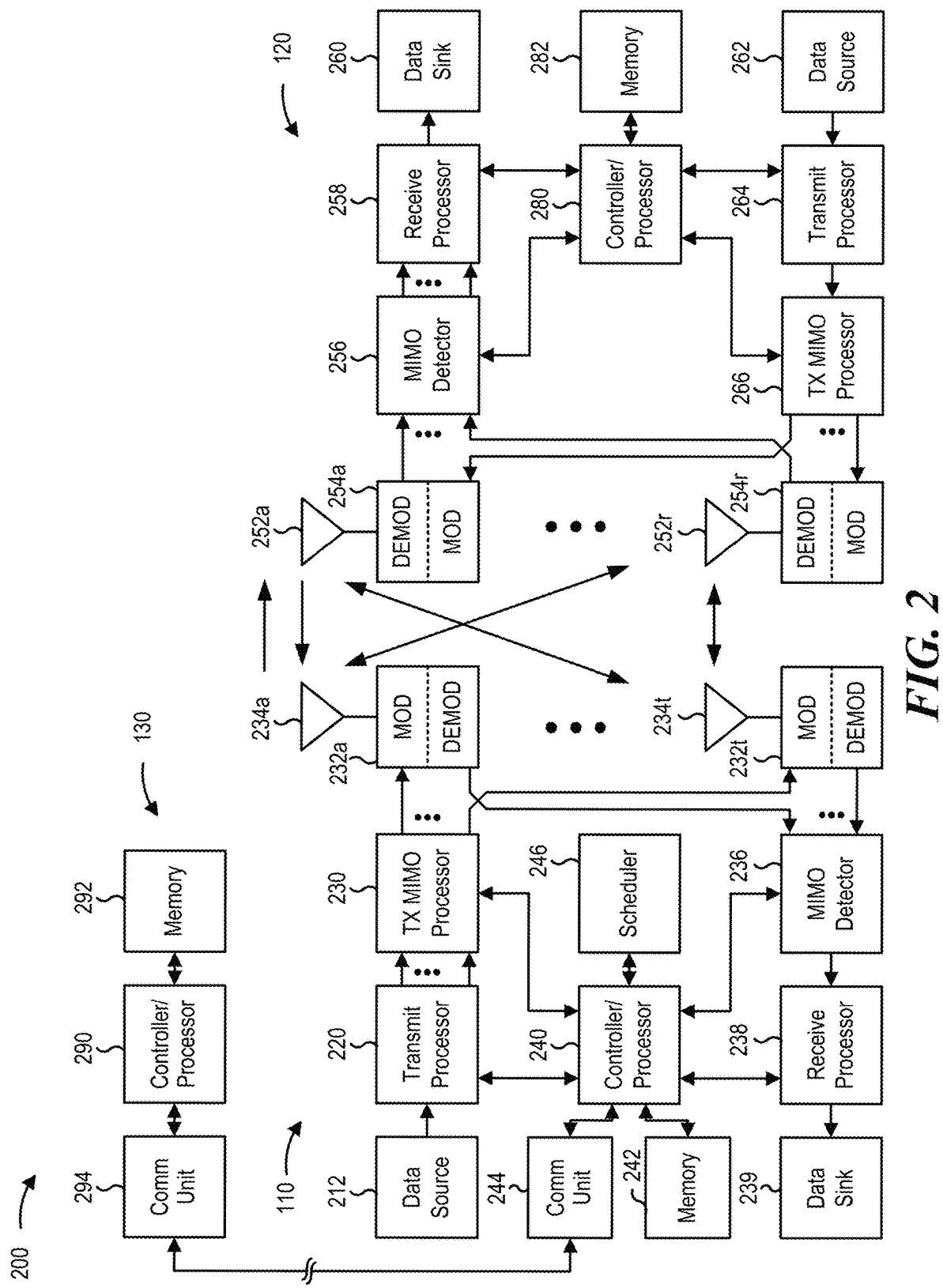
FIG. 2 is a block diagram conceptually illustrating an example of a base station in communication with a user equipment (UE) in a wireless communications network, in accordance with various aspects of the present disclosure.

FIG. 2 is a block diagram 200 conceptually illustrating an example of a base station in communication with a UE, which may be one of the base stations 110 and one of the UEs 120 in FIG. 1, in a wireless communications network. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with UE requested CORESET/SS sets, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-13 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for transmitting, means for communicating, means for deactivating, means for receiving, means for switching, means for monitoring, means for remaining, means for retransmitting, means for performing, means for stopping, and means for starting. Such means may include one or more components of the UE 120 described in connection with FIG. 2.

As indicated above, FIG. 2 is provided merely as an example. Other examples may differ from what is described with regard to FIG. 2.

In addition to regular or higher capability devices, wireless communication may support reduced capability devices. Among others, examples of higher capability devices may include premium smartphones, vehicle to everything (V2X) devices, ultra reliable and low latency communication (URLLC) devices, enhanced mobile broadband (eMBB) devices, etc. Examples of reduced capability devices may include wearables, industrial wireless sensor networks (IWSN), surveillance cameras, low-end smartphones, etc. NR communication systems may support both higher capability devices and reduced capability devices. A reduced capability device may be referred to as an NR light device, a low-tier device, a lower tier device, etc. Reduced capability (RedCap) UEs may communicate based on various types of wireless communication. For example, smart wearables may transmit or receive communication based on low power wide area (LPWA)/massive machine type communications (mMTC) techniques, relaxed IoT devices may transmit or receive communication based on URLLC techniques, sensors/cameras may transmit or receive communication based on eMBB techniques, etc.

In some examples, a reduced capability UE may have an uplink transmission power of at least 10 dB less than that of a higher capability UE. As another example, a reduced capability UE may have reduced transmission bandwidth or reception bandwidth compared to other UEs. For instance, a reduced capability UE may have an operating bandwidth between 5 MHz and 10 MHz for both transmission and reception, in contrast to other UEs, which may have 20-100 MHz bandwidth. As a further example, a reduced capability UE may have a reduced number of reception antennas in comparison to other UEs. For instance, a reduced capability UE may have only a single receive antenna and may experience a lower equivalent receive signal to noise ratio (SNR) in comparison to higher capability UEs that may have multiple antennas. Reduced capability UEs may also have reduced computational power compared to other UEs. Also, a reduced capability UE may be more delay tolerant, such that it may have a more enhanced power saving and battery life configuration. Although the present disclosure refers to reduced capacity UEs, the disclosure is not so limited, as any type of UE is contemplated.

It may be helpful for communication to be scalable and deployable in a more efficient and cost effective way. For example, it may be possible to relax or reduce peak throughput, latency, and/or reliability requirements for the reduced capability devices. In some examples, reduction in power consumption, complexity, production cost, and/or reduction in system overhead may be prioritized. As an example, industrial wireless sensors may have an acceptable latency of up to approximately 100 ms. In some safety related applications, the latency of industrial wireless sensors may be acceptable up to 10 ms or up to 5 ms. The data rate may less than 2 Megabits per second (Mbps) and may include more uplink traffic than downlink traffic. As another example, video surveillance devices may have an acceptable latency of up to approximately 500 ms. The data rate may be, for example, 2-4 Mbps and may include more uplink traffic than downlink traffic. In some examples, the data rate may be more than 4 Mbps, or more than 7 Mbps, for example, 7.5-25 Mbps for high-end devices. For example, a video camera may only upload data a few times a day. When the upload occurs, there is a large amount of data. However, the uploads occur relatively infrequently.

A communication network may support the use of bandwidth parts (BWPs), where a BWP may be a contiguous set of physical resource blocks (PRBs) on a given component carrier (CC). Data and control channels may be received and/or transmitted within the BWP. BWPs may provide the network with more flexibility in assigning resources in a given CC as BWPs may enable multiplexing of different signals and signal types for more efficient use of spectrum and UE power. For example, a CC may be divided into multiple BWPs (e.g., one to four BWPs per CC) and each BWP may be used for different purposes. A BWP may further be configured with various parameters that may include numerology, frequency location, bandwidth size, and/or CORESET.

A CORESET may correspond to a set of physical resources in time and frequency that a UE uses to monitor for PDCCH/DCI. Each CORESET may comprise one or more resource blocks in the frequency domain and one or more symbols in the time domain. As an example, a CORESET might include multiple resource blocks (RBs) in the frequency domain and 1, 2, or 3 contiguous symbols in the time domain. A resource element (RE) is a unit indicating one subcarrier in frequency over a single symbol in time. A control channel element (CCE) includes resource element groups (REGs), for example, 6 REGs, in which a resource element group (REG) may correspond to one RB (e.g., 12 REs) during one OFDM symbol. REGs within a CORESET may be numbered in increasing order in a time-first manner, starting with 0 for the first OFDM symbol and the lowest-numbered resource block in the control resource set. A UE may be configured with multiple CORESETs (e.g., up to three), each CORESET being associated with a CCE-to-REG mapping. Each CORESET may be assigned with a CORESET identifier (ID). As each UE may use up to four BWPs in a transmission, a UE may be configured with up to 12 CORESETs on a serving cell, where each CORESET may be assigned with an index of 0-11 (e.g., CORESET ID).

A UE may perform blind decoding for a set of PDCCH candidates, where PDCCH candidates to be monitored may be configured for the UE by search space (SS) sets. For example, there may be a common SS set that is generally monitored by a group of UEs in a cell, and there may be a UE-specific SS set that is monitored by a specific UE. A base station may configure multiple CORESETs and multiple SS sets for a UE. For example, the base station may configure three CORESETs and 10 SS sets per BWP for the UE. The UE may be configured for multiple BWPs (e.g., four BWPs), such that a UE may be configured with up to 40 SS sets, where each SS set may be assigned with an index of 0-39. Each SS set may be associated with a CORESET. Each CORESET ID of the CORESETS configured for the UE may map to a particular BWP, and each SS set ID of the multiple SS sets configured for the UE may map to a particular BWP, for example.

Figure 3:
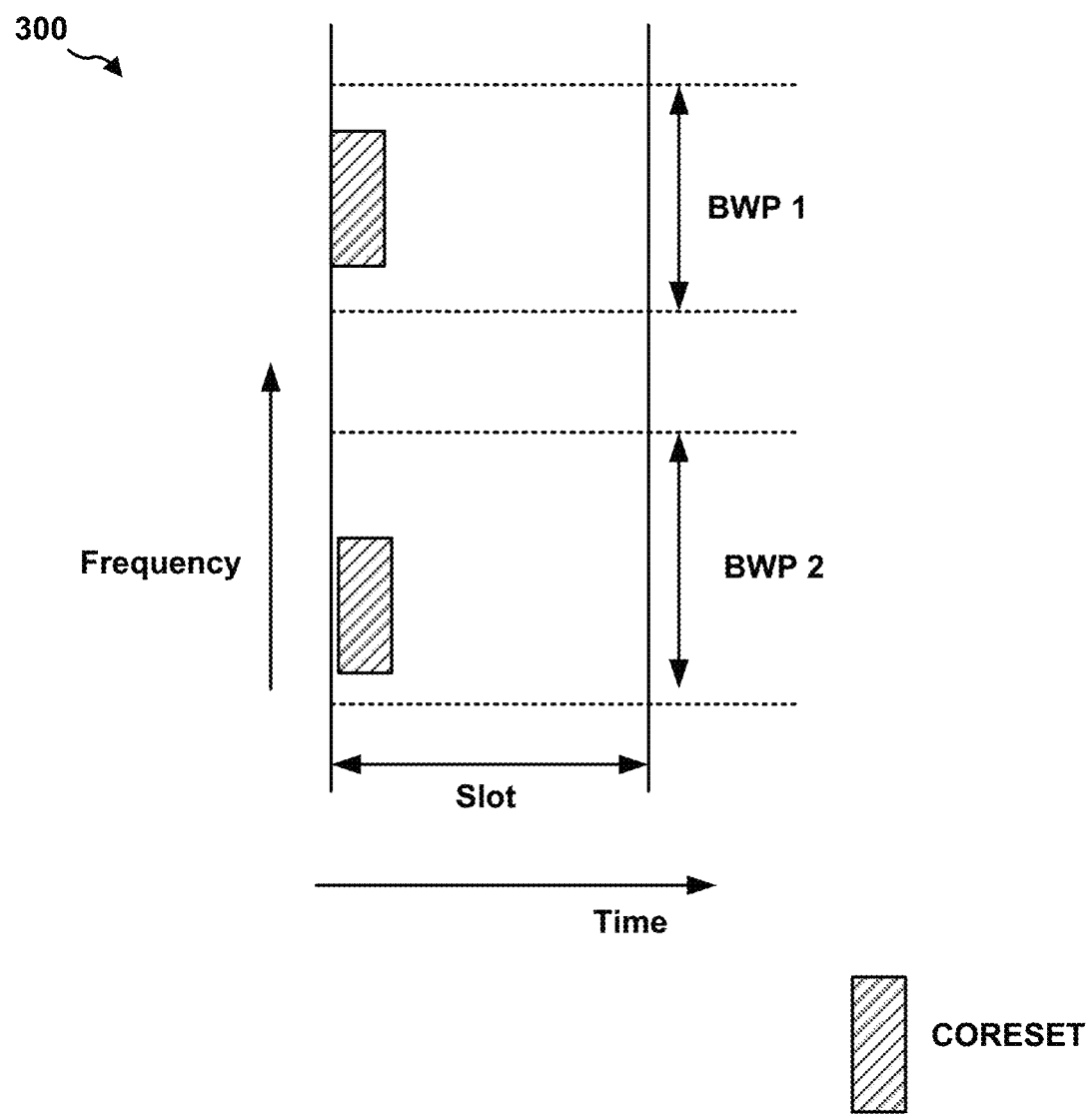
FIG. 3 is a block diagram illustrating an example time and frequency diagram showing multiple bandwidth parts (BWPs), and a control resource set (CORESET) for each BWP.

FIG. 3 is a block diagram illustrating an example time and frequency diagram 300 showing multiple BWPs, and a CORESET for each BWP. A SS may comprise a set of CCEs, for example, at different aggregation levels). For example, the SS may indicate a number of candidates to be decoded (e.g., in which the UE performs decoding). A CORESET may comprise multiple SS sets.

There may be multiple ways to schedule an uplink communication for a UE, such as using a configured grant (CG), or using a dynamic UL grant. A CG may provide advance resource allocation of periodic resources for the UE. However, a CG may consume network resources when the UE does not have anything to transmit, resulting in granted resources not being used. In order to avoid wasted resources, the CG may include a longer period between the periodic resources. However, the UE may have more frequent data to send, in some examples. Thus, it may be difficult for a CG to provide resource allocation for transmissions that have large latency specifications and/or heavy uplink traffic. On the other hand, dynamic UL grants may specify a base station to configure the UE with periodic CORESETs and/or SS sets, and may specify the UE to constantly monitor for the downlink PDCCH. Monitoring for PDCCH may increase the UE's power consumption and/or network uplink traffic.

Aspects of the present disclosure help to reduce the amount of downlink PDCCH monitoring for a UE, such as a reduced capability UE, while enabling more efficient scheduling of resources for the UE. By reducing downlink PDCCH monitoring occasions for a UE, the UE's power consumption may be reduced, more resources may be provided for the uplink traffic (e.g., especially for uplink heavy traffic in time division duplexed (TDD) systems), and downlink overhead that results from unused downlink resources (e.g., pre-configured CG) may be reduced.

Control channel resources (e.g., CORESETs) may be indicated by dynamic signaling, for example, via a PDCCH in regular (sparse/periodic) control channel resources carrying downlink control information (DCI) or layer 1 (L1) signaling. Unlike regular control channel resources, the dynamic CORESETs are non-recurring (aperiodic) and may be for a single (or a limited number) of monitoring occasions. Because the dynamic CORESET is not configured earlier by radio resource control (RRC) signaling, the dynamic CORESET does not appear in a regular searching location. Rather, the dynamic CORESET is scheduled by another CORESET to appear at additional searching locations. The dynamic CORESET, thus, provides additional opportunities for control channel transmissions between sparsely configured search spaces.

Sparsely configured search spaces may be appropriate for reduced capability NR devices, where power savings and battery lifetime enhancements are objectives. These reduced capability NR devices may be delay tolerant.

As noted above, some use cases have large latency tolerance and are uplink heavy. Uplink traffic, however, may not always be present. To enable uplink traffic, two options presently exist: preconfigured configured grants (CGs) or dynamic grants.

Dynamic uplink grants specify the base station (e.g., gNB) to configure a UE with periodic CORESET/SS sets. There may be a need, however, to reduce unnecessary downlink (DL) traffic. For example, reducing physical downlink control channel (PDCCH) monitoring occasions for a reduced capacity UE reduces UE power consumption, and leaves more resources for uplink traffic. This may be particularly useful when uplink heavy traffic patterns are expected. Reducing downlink traffic also reduces downlink overhead (e.g., unnecessary unused downlink resources).

Because the latency tolerance for some reduced capacity UEs is large, some latency can be tolerated for scheduling uplink traffic. To address the need for additional CORESETs in sparsely configured search spaces, aspects of the present disclosure define UE requests for one or more CORESET/search space set(s). The requests are for actions such as configuring the CORESETs, activating the CORESETs, and/or deactivating the CORESETs. The CORESETs may be regular or dynamic CORESETs.

Figure 4:
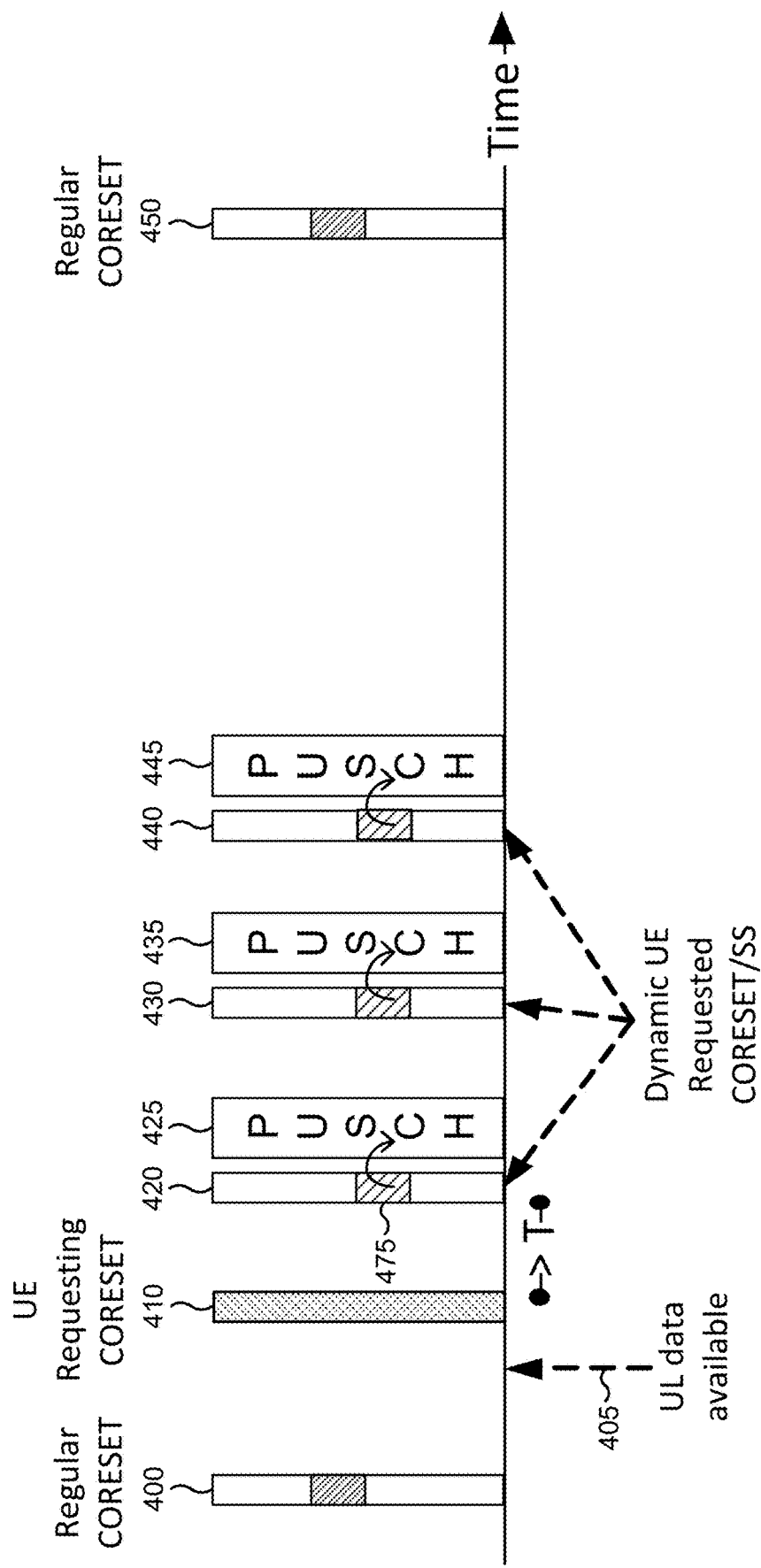
FIG. 4 is a diagram illustrating a timeline for user equipment (UE) requested control resource set (CORESET)/search space sets, in accordance with aspects of the present disclosure.

FIG. 4 is a diagram illustrating a timeline for user equipment (UE) requested control resource set (CORESET)/search space (SS) sets, in accordance with aspects of the present disclosure. In FIG. 4, the regular CORESETs are sparse, occurring at times 400 and 450. In this example, uplink data becomes available between the sparsely located CORESETs. As seen in FIG. 4, uplink data becomes available at time 405. Thus, a UE requests a CORESET at time 410, instead of waiting for the next regular CORESET at time 450. In response, at time 420, a CORESET is transmitted including a PDCCH 475. The PDCCH 475 includes DCI for scheduling a physical uplink shared channel (PUSCH) at time 425 to enable transmission of the newly available data. At times 430 and 440, additional CORESETs are transmitted in response to the request. The additional CORESETs schedule PUSCHs at times 435 and 445 to enable continued uplink transmission of the newly available data. Although FIG. 4 depicts dynamic CORESETs with a predetermined number of search space occasions (three in this example), regular semi-static CORESETs are also contemplated.

In some aspects of the present disclosure, the UE request may include a request for one or more out of one or more preconfigured candidate CORESET/SS sets. The preconfigured candidate CORESET(s)/SS set(s) may be indicated to the UE in radio resource control (RRC) signaling. An extra bit may indicate the CORESETs as configured but not activated, in other words, as candidates. In these aspects, the request includes a small amount of data, for example, an index indicating the requested candidate. When a large number of candidates are available, the index may be a desirable solution for requesting CORESETs.

In other aspects of the present disclosure, the CORESET/SS set is implicitly chosen. For example, an RRC configuration may map certain CORESET/SS sets to certain occasion locations. Examples of such occasion locations include a random access channel (RACH) occasion location or a scheduling request (SR) occasion location. In these aspects, the UE may send a scheduling request at a third occasion, which is associated with a third candidate CORESET/SS, for example, to request the third candidate CORESET/SS set. The implicit signaling is well suited for requests when a small number of candidates exists.

In yet other aspects of the present disclosure, the UE may start/stop monitoring the CORESET(s)/SS set(s) not before a certain time from the request (e.g., event that triggered the activation/deactivation). A timer may be started after the request to enable this feature. Referring back to FIG. 4, the time T starting at time 410 elapses before monitoring begins at time 420. The time T may be network configured or requested by the UE. The UE may request a specific arbitrary time or a time based on UE capability. For example, the UE recognizes how long it takes before the UE is ready for monitoring and may request the time accordingly.

In still other aspects, the UE interprets certain activity as an acknowledgment of the request. For example, when the PDCCH is received on the requested CORESET/search space occasion, the received PDCCH may be treated as an acknowledgment (ACK) that the request was received by the network. If the PDCCH is not received on the requested CORESET/SS occasion, the UE may assume the network did not receive the request or the network received the request but decided not to honor the request.

The UE may receive an implicit or explicit denial of the request. For implicit notification, when the network decides not to activate the requested CORESET/SS set, or the network did not receive the request, the UE starts a timer, as discussed above with respect to FIG. 4. If for a certain number of search space occasions, the UE is not able to decode the PDCCH with the corresponding radio network temporary identifier (RNTI), the UE may assume that the network did not activate the requested CORESET/SS set. The UE may then stop monitoring. The number of search space occasions may be configured or pre-agreed upon. For explicit denial, the network may send a deny message in the first search space occasion after the request was transmitted. After receiving the deny request, the UE does not monitor any additional search space occasions related to this request.

Other aspects of the present disclosure address duration of CORESET/SS sets. Deactivation may occur based on parameters in the UE request or in a first downlink control information (DCI) message received after the request. The parameters define the validity of the CORESET/SS set(s) (e.g., number of occurrences and/or how long the CORESET/SS set(s) last). If the UE does not request deactivation and the DCI does not specify deactivation, the duration of the CORESET/SS sets may be indefinite.

Figure 5:
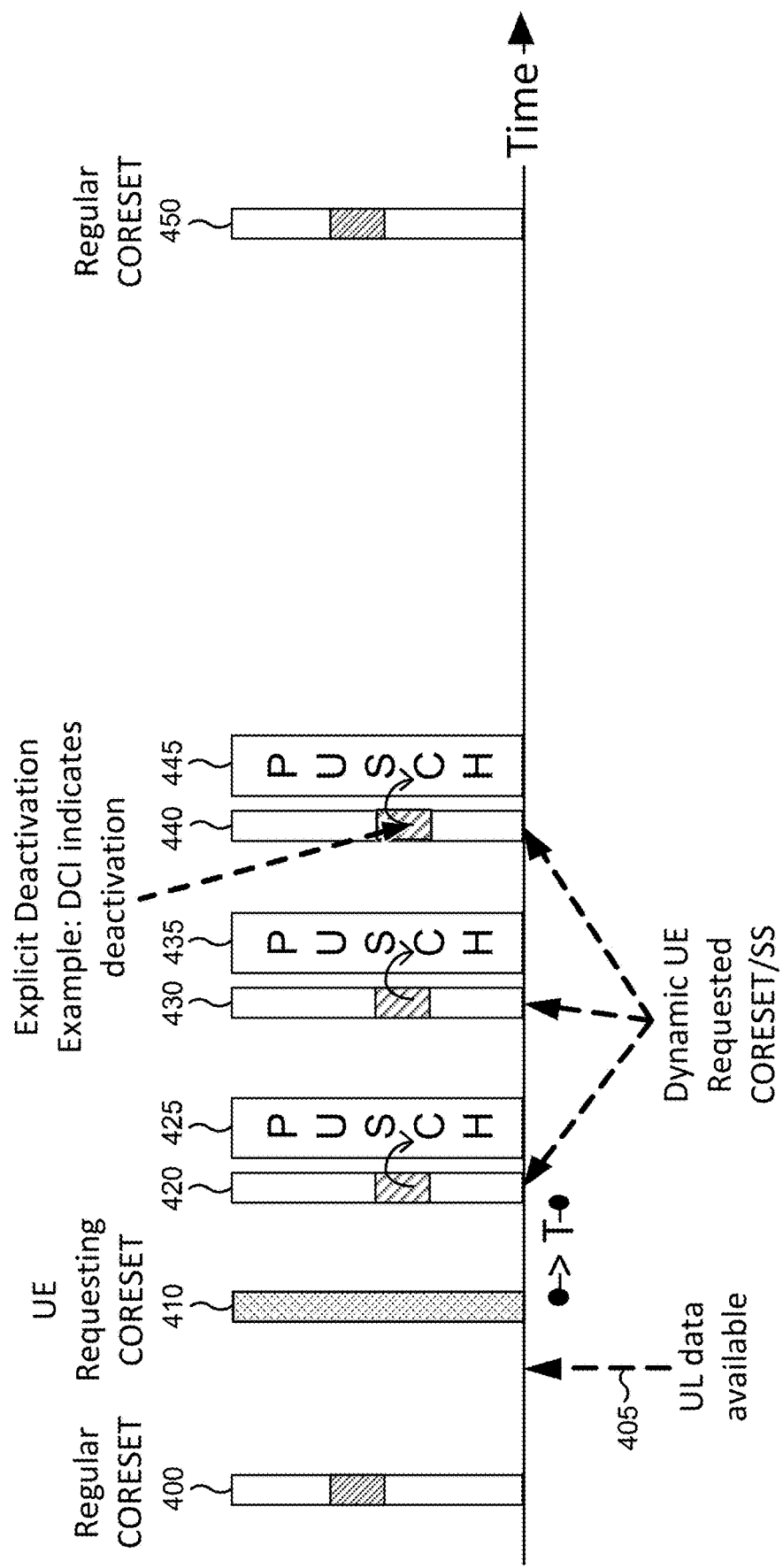
FIG. 5 is a diagram illustrating a timeline for explicit deactivation of user equipment (UE) requested control resource set (CORESET)/search space sets, in accordance with aspects of the present disclosure.

Deactivation may be explicitly set based on a UE request. For example, deactivation may be requested in a medium access control-control element (MAC-CE) of one of the physical uplink shared channel (PUSCH) transmissions. In other examples, the deactivation is set based on information in the request itself (see FIG. 4, time 410), as discussed previously. Deactivation may also be based on a network indication. FIG. 5 is a diagram illustrating a timeline for explicit deactivation of user equipment (UE) requested control resource set (CORESET)/search space sets, in accordance with aspects of the present disclosure. For example, as seen in FIG. 5, the DCI in the grant at time 440 indicates deactivation. Alternatively, DCI without a grant may include a downlink format indicator (DFI) to indicate deactivation.

Figure 6:
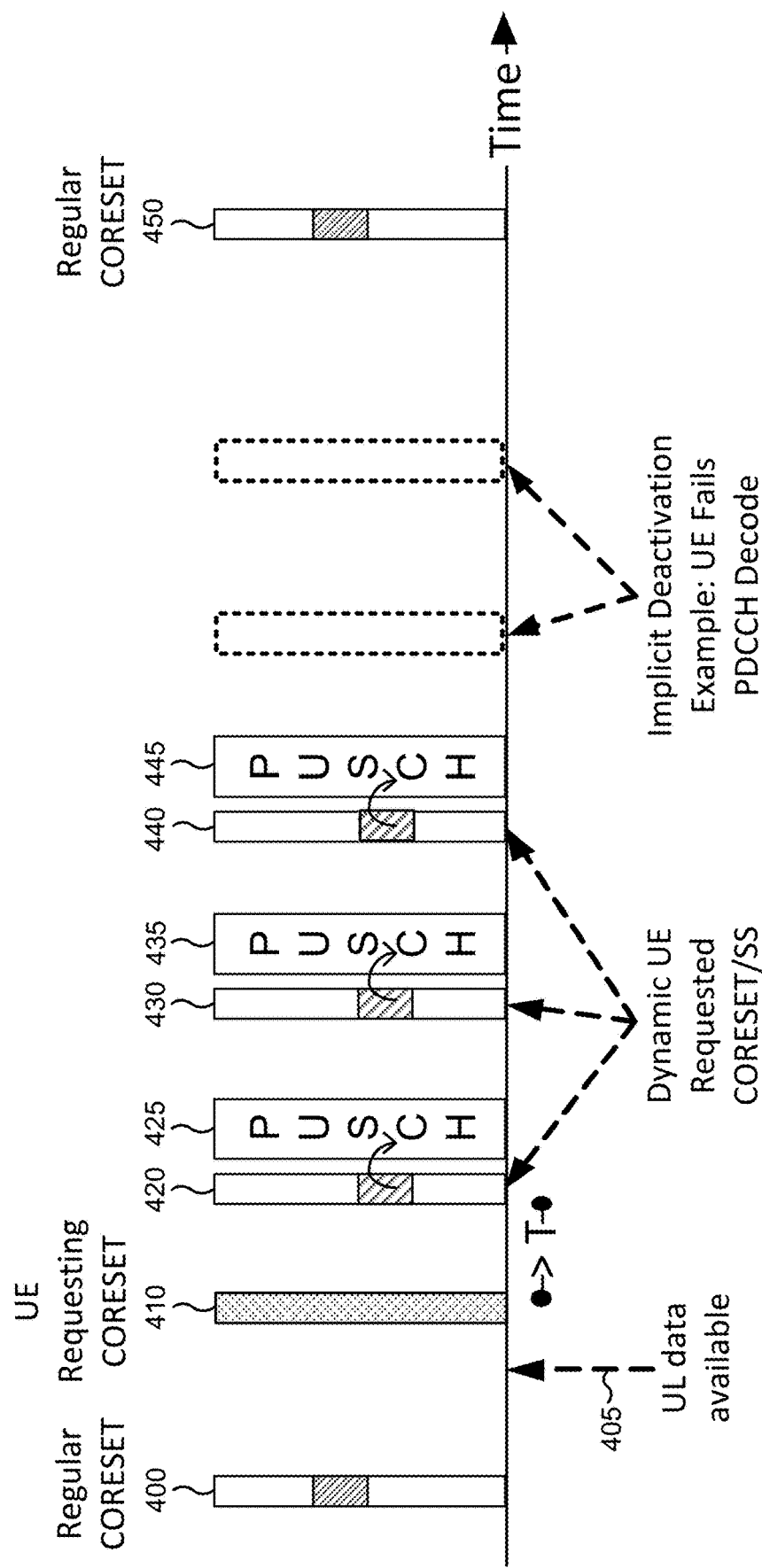
FIG. 6 is a diagram illustrating a timeline for implicit deactivation of user equipment (UE) requested control resource set (CORESET)/search space sets, in accordance with aspects of the present disclosure.

Deactivation may be implicitly indicated. FIG. 6 is a diagram illustrating a timeline for implicit deactivation of user equipment (UE) requested control resource set (CORESET)/search space sets, in accordance with aspects of the present disclosure. For example, the deactivation may be based on a certain time of PDCCH inactivity. As seen in FIG. 6, after time 445 no PDCCHs are successfully decoded. Thus, the UE interprets this inactivity (two unsuccessful decoding attempts) as deactivation.

In other examples, a buffer status report (BSR) indicates deactivation. In these examples, the UE sends buffer status reports to the network informing the network of how much data the UE has to send. When the buffer status report indicates a low level of data to be sent, the network deactivates the CORESET/SS sets. The level may be pre-negotiated between the UE and the network.

Deactivation may occur in a different manner for dynamic CORESETs. In these cases, deactivation may be based on a configured number of occurrences for the dynamic CORESET.

As indicated above, FIGS. 3-6 are provided as examples. Other examples may differ from what is described with respect to FIGS. 3-6.

Figure 7:
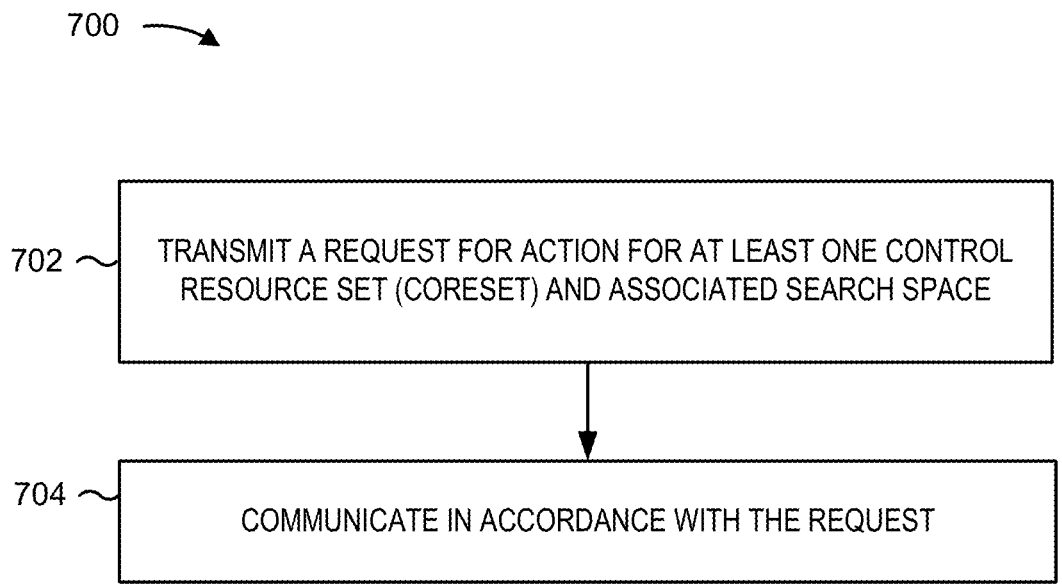
FIG. 7 is a flow diagram illustrating an example process performed, for example, by a user equipment (UE), in accordance with various aspects of the present disclosure.

FIG. 7 is a flow diagram illustrating an example process 700 performed, for example, by a UE, in accordance with various aspects of the present disclosure. The example process 700 is an example of user equipment (UE) requested control resource sets (CORESET)/search space (SS) sets.

As shown in FIG. 7, in some aspects, the process 700 may include transmitting a request for action for at least one control resource set (CORESET) and associated search space (block 702). For example, the UE (e.g., using the antenna 252, DEMOD/MOD 254, TX MIMO processor 266, transmit processor 264, controller processor 280 and/or memory 282) may transmit a request for action. The action may be configuring, activating, and/or deactivating the at least one CORESET and associated search space. The CORESET may be a dynamic CORESET with a predefined number of search space occasions or a semi-static CORESET.

As shown in FIG. 7, in some aspects, the process 700 may include communicating in accordance with the request (block 704). For example, the UE (e.g., using the antenna 252, DEMOD/MOD 254, MIMO detector 256, receive processor 258, TX MIMO processor 266, transmit processor 264, controller processor 280 and/or memory 282) may communicate in accordance with the request. The UE may receive an acknowledgment of the request in a PDCCH (physical downlink control channel) in a requested search space. The UE may stop monitoring for the at least one CORESET after failing to decode a predetermined number of PDCCHs (physical downlink control channels) after transmitting the request. The predetermined number of PDCCHs begins a predetermined time after transmitting the request. In other aspects, the UE may receive a deny message in a first search space occasion after transmitting the request. The UE may then stop monitoring additional search space occasions related to the request in response to receiving the deny message.

As described above, a user equipment (UE) may request one or more control resource set (CORESET) and/or search space (SS) set(s) configured for the UE to be changed (e.g., activated, deactivated, configured, modified, etc.). For example, a UE may be configured with a CORESET(s)/SS set(s) having a longer periodicity (e.g., sparse in time), where the UE does not monitor for PDCCH in the time between scheduled CORESET(s)/SS set(s). When data is to be transmitted by the UE during this non-monitoring period, the UE may send a message to the base station with a request about CORESET(s)/SS set(s). In some aspects, the request may reference one or more CORESET and/or one or more SS set(s) that the base station previously configured for the UE. The UE may send the request through a scheduling request (SR), RACH, and/or RRC signaling, etc.

The request may include one or more parameters for the CORESET or the SS set that may include an aggregation level, a physical downlink control channel (PDCCH) candidate, a number of PDCCH candidates, a transmission configuration indicator (TCI) state for the PDCCH, or one or more repetitions for the PDCCH. Such dynamic or on-demand configuration enables CORESET(s)/SS set(s) to be scheduled for the UE based at least in part on the uplink traffic.

Figure 8:
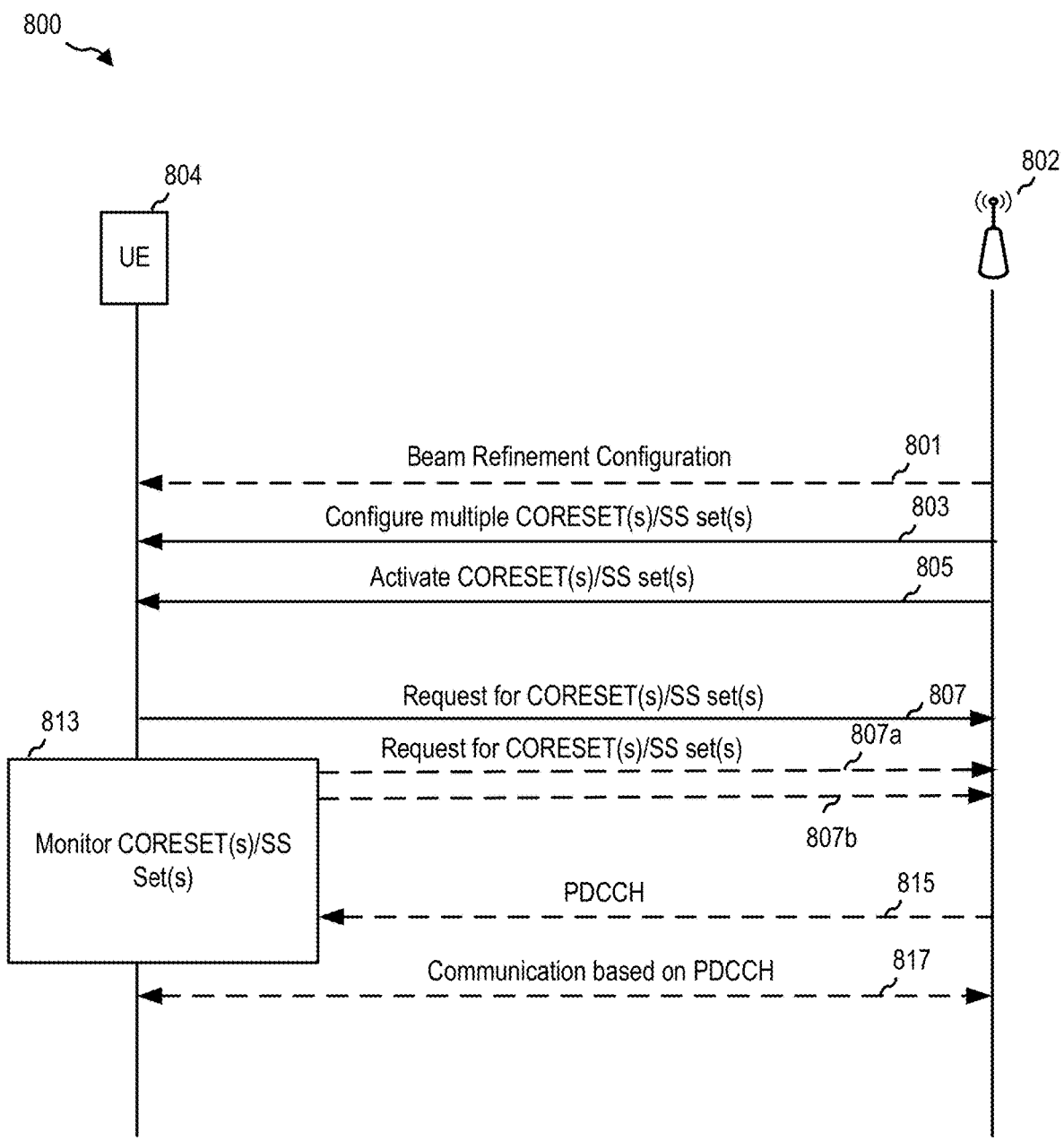
FIG. 8 is a call flow diagram illustrating an example communication flow between a user equipment (UE) and a base station, in accordance with various aspects of the present disclosure.

FIG. 8 is a call flow diagram illustrating an example communication flow 800 between a user equipment (UE) 804 and a base station 802, in accordance with various aspects of the present disclosure. As described, the UE 804 may transmit a request 807 for a new or modified CORESET(s)/SS set(s) or for a preferred configuration of CORESET(s)/SS set(s). In some examples, the UE 804 may send the request 807 in response to having uplink data to transmit. The request 807 may request the CORESET(s) and/or SS set(s) to be activated, deactivated, modified, or the like. The request 807 may be carried in one or more of an uplink RRC message, a physical uplink control channel (PUCCH), a SRS, a RACH, or a PUSCH. In some aspects, the request 807 may be multiplexed with a scheduling request (SR), a channel state information (CSI) related signal such as a CSI reporting signal, or a hybrid automatic repeat request (HARQ) ACK signal.

The request may specify one or more of: 1) one or more preconfigured CORESET(s)/SS set(s) that may be previously indicated to the UE 804 in RRC signaling, 2) the validity of the CORESET(s)/SS set(s) including a number of occurrences, and/or how long the CORESET(s)/SS set(s) last (unspecified may be treated as indefinite), 3) specific CORESET/SS parameters such as an aggregation level, a physical downlink control channel (PDCCH) candidate, a number of PDCCH candidates, 4) a desired transmission configuration indicator (TCI) state for the PDCCH, or 5) a desired number of repetitions for the PDCCH.

In some aspects, the base station 802 may change configurations of the CORESET(s)/SS set(s) based on the requested CORESET/SS parameters. The request 807 may request downlink control information (DCI) for one or more of an uplink dynamic grant, downlink beam training, or a downlink dynamic grant. For example, the UE 804 may request DCI for an uplink dynamic grant only. In some examples, the UE 804 may request DCI for uplink dynamic grants and downlink beam training. In some examples, the UE 804 may request DCI for uplink dynamic grants and downlink dynamic grants.

In some aspects, if the request 807 is not acknowledged by the base station 802 within a preconfigured duration, for example, by receiving a PDCCH corresponding to the request, the UE 804 may retransmit the request for a configurable number n times, as illustrated at 807a and 807b. Although an example of two retransmissions is illustrated, the concept may be applied for any number n of transmissions The UE 804 may receive information that indicates the threshold number n, or information that may be used to determine the threshold number n, from the base station 802 before 807, such as in 803. In some aspects, the duration may be a length of time or a number of occurrences of a CORESET/SS set. In some aspects, the preconfigured duration may be transmitted in the request 807. In some aspects, the retransmission may be transmitted via the same UE transmit (Tx) beam. The UE Tx beam may be based on a prior sounding reference signal indicator (SRI) or a prior uplink transmission beam. In other aspects, the UE 804 transmits the request and the one or more repetitions of the request each using a different transmission beam. The request may be used by the base station 802 for receive (Rx) beam refinement.

After sending the request 807, the UE 804 may start monitoring for PDCCH, at 813. In some aspects, the UE 804 may monitor for PDCCH in the corresponding bandwidth part (BWP) for the requested CORESET(s)/SS set(s).

In some aspects, prior to the request 807, as illustrated at 803, the base station 802 may configure multiple CORESETs and SS sets for the UE 804. Each CORESET and/or SS set may have an associated identifier (e.g., a CORESET ID or an SS set ID). At 805, the base station 802 may activate one or more of the CORESETs and SS sets for the UE 804.

In some examples, the base station 802 may not receive the UE's request, the base station 802 may not be able to honor the UE's request, or the base station 802 may determine to ignore the UE's request (e.g., without explicit denial), etc. In these examples, the base station 802 may not send the PDCCH to the UE 804 for the CORESET(s) SS set(s) in accordance with the request 807. The base station 802 may continue to send the PDCCH to the UE 804 based on the previously activated CORESET(s)/SS set(s). In other examples, the base station 802 may transmit the PDCCH (e.g., PDCCH 815) based on the requested CORESET/SS set.

In some other examples, the base station 802 may grant the UE's request and/or may communicate with the UE 804 based on the request. For example, the base station 802 may send a reply to the request 807 accepting the request, activating the CORESET/SS set, deactivating the CORESET/SS set, or modifying the CORESET/SS set, etc. In some examples, the reply may be the PDCCH 815 to the UE corresponding to the request 807.

In some examples, the PDCCH 815 may allocate resources for communication between the UE 804 and the base station 802. At 817, the UE 804 may communicate with the base station 802 based on the resources allocated in the PDCCH 815. In some aspects, the base station 802 may transmit an indication of which beam to use, such as for the PUSCH. In some aspects where the UE 804 previously transmitted the request with repetitions using different transmission beams, the base station 802 may transmit an indication of a beam for the UE 804 to use. In other aspects where the retransmission of the request was transmitted via the same UE Tx beam, the base station 802 may use the UE Tx beam for beam refinement. The request may be used by the base station 802 for Rx beam refinement.

In some aspects, as illustrated in 801, the base station 802 may configure the UE 804 to perform SRS beam refinement procedures before transmission of the request. The beam refinement procedures may be in connection with transmitting the request. In some other aspects, the base station 802 may configure the UE 804 to perform SRS beam refinement procedures after transmission of the request. The SRS may be used for base station Rx or UE Tx beam refinement.

At a later time, the base station 802 may deactivate the requested CORESET(s)/SS set(s) for the UE 804. As an example, the base station 802 may deactivate the CORESET/SS set after the UE 804 has finished a transmission.

Figure 9:
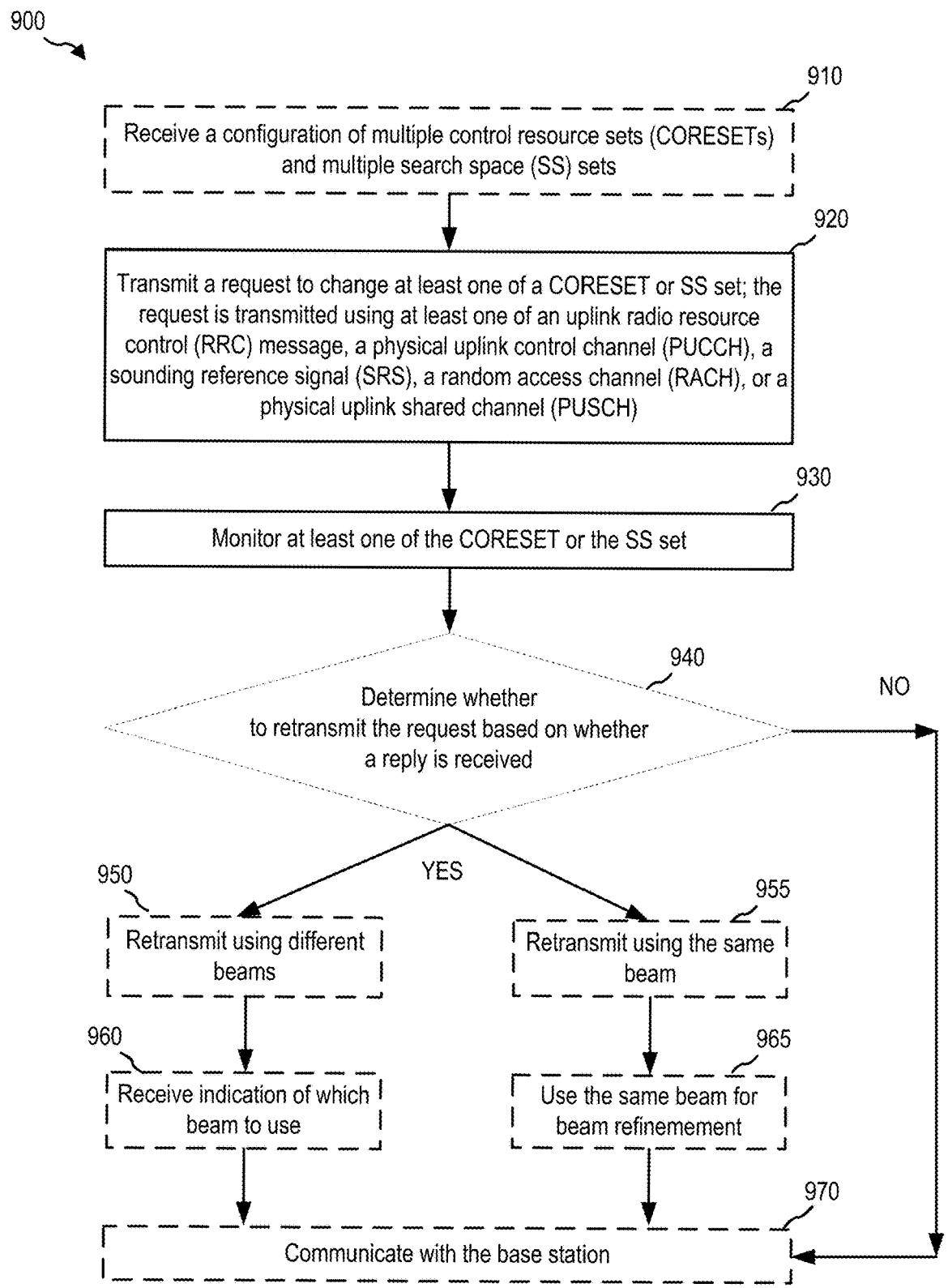
FIG. 9 is a flow diagram illustrating an example of a method performed, for example, by a user equipment (UE), in accordance with various aspects of the present disclosure.

FIG. 9 is a flow diagram illustrating an example of a method 900 performed, for example, by a user equipment (UE), in accordance with various aspects of the present disclosure. The method 900 may be performed by the UE 120, 804; a processing system, which may include the memory 282 and which may be the entire UE 120 or a component of the UE 120, such as the TX processor 264, the RX processor 258, the demodulator/modulator 254, antenna 252, MIMO detector 256, TX MIMO processor 266, and/or the controller/processor 280. Optional aspects are illustrated with a dashed line. The method 900 may enable the UE to request a change, such as activate, deactivate, or modify, CORESET or SS SET. In some examples, the method 900 may include aspects described in connection with the UE 804 in FIG. 8.

At block 910, the UE may receive a configuration of multiple CORESETs and multiple SS sets from a base station. The configuration may include aspects described in connection with 803 in FIG. 8. The multiple CORESETs and multiple SS sets may also be activated by the base station 802. The activation may include aspects described in connection with 805 in FIG. 8.

At block 920, the UE may transmit a request for a change for at least one of a CORESET or a SS set. The change may comprise at least one of: an activation of the at least one of the CORESET or the SS set, a deactivation of the at least one of the CORESET or the SS set, or an adjustment for the at least one of the CORESET or the SS set, etc. The request may be transmitted using at least one of an uplink RRC message, a PUCCH, a SRS, a RACH, or a PUSCH. In some examples, the request may be for more than one CORESET and/or more than one SS set. The request may include aspects described in connection with the request 807 in FIG. 8. In some aspects, the request may be multiplexed with a SR, a CSI related signal such as a CSI reporting signal, or a HARQ ACK signal.

In some aspects, the request indicates at least one CORESET of the multiple CORESETs or at least one SS set of the multiple SS sets. In some aspects, the request indicates a duration associated with the request. The duration may be at least one of a number of occurrences of the CORESET or the SS set or a length of time. The request may specify at least one of: 1) one or more preconfigured CORESET(s)/SS set(s) that may be previously indicated to the UE 804 in RRC signaling, 2) the validity of the CORESET(s)/SS set(s) including one or more of number of occurrences, how long the CORESET(s)/SS set(s) last (unspecified may be treated as indefinite), 3) specific CORESET/SS parameters such as an aggregation level, a physical downlink control channel (PDCCH) candidate, a number of PDCCH candidates, 4) a desired transmission configuration indicator (TCI) state for the PDCCH, or 5) a desired number of repetitions for the PDCCH. In some aspects, the base station 802 may change configurations of the CORESET(s)/SS set(s) based on the requested CORESET/SS parameters. The request may request downlink control information (DCI) for one or more of an uplink dynamic grant, downlink beam training, or a downlink dynamic grant. For example, the UE 804 may request DCI for uplink dynamic grants only, may request DCI for uplink dynamic grants and downlink beam training, or may request DCI for uplink dynamic grants and downlink dynamic grants.

At block 930, the UE may monitor at least one of the CORESET or the SS set. The monitoring may include aspects described in connection with 813 in FIG. 8. In some aspects, the UE 804 may monitor for the PDCCH in the corresponding BWP for the requested CORESET(s)/SS set(s).

While monitoring for at least one of the CORESET or the SS set, at block 940, the UE may determine whether to retransmit the request based on whether a reply is received, such as whether the reply is received within a configured duration. The determination may include aspects described in connection with the request 807 and 807n in FIG. 8. The configuration for retransmission may be previously received from the base station 802.

If a reply, such as a reply in the form of PDCCH transmission in accordance with the request is received, the request will not be retransmitted, and the UE may further communicate with the base station at block 970. The further communication may be based on the transmitted PDCCH. The further communication may include aspects described in connection with 817 in FIG. 8.

If a reply is not received within the duration, in some aspects, at block 950, the UE may retransmit the request for a configurable number n times, each using a different transmission beam. The number n may be a threshold number n previously received from the base station 802. The retransmission may include aspects described in connection with 807a and 807b in FIG. 8.

At block 960, the UE may receive an indication of which beam to use in further communication with the base station. The indication may indicate which beam to use in further PUSCH communication between the UE 804 and the base station 802. The receiving may include aspects described in connection with 815 and 817 in FIG. 8.

If a reply is not received within the duration, in some aspects, at block 955, the UE may retransmit the request for a configurable number n times, each using the same transmission beam. The same transmission beam may be based on a prior sounding reference signal indicator (SRI) or a prior uplink transmission beam. The number n may be a threshold number n previously received from the base station 802. The retransmission may include aspects described in connection with 807a and 807b in FIG. 8.

At block 965, the UE may use the same transmission beam for beam refinement. The indication may indicate which beam to use in further PUSCH communication between the UE 804 and the base station 802. The refinement may include aspects described in connection with 815 and 817 in FIG. 8. In some aspects, the refinement may be in accordance with a beam refinement procedure previously received. In some aspects, the UE 804 may receive a configuration to perform SRS beam refinement prior to or after transmitting the requests.

Figure 10:
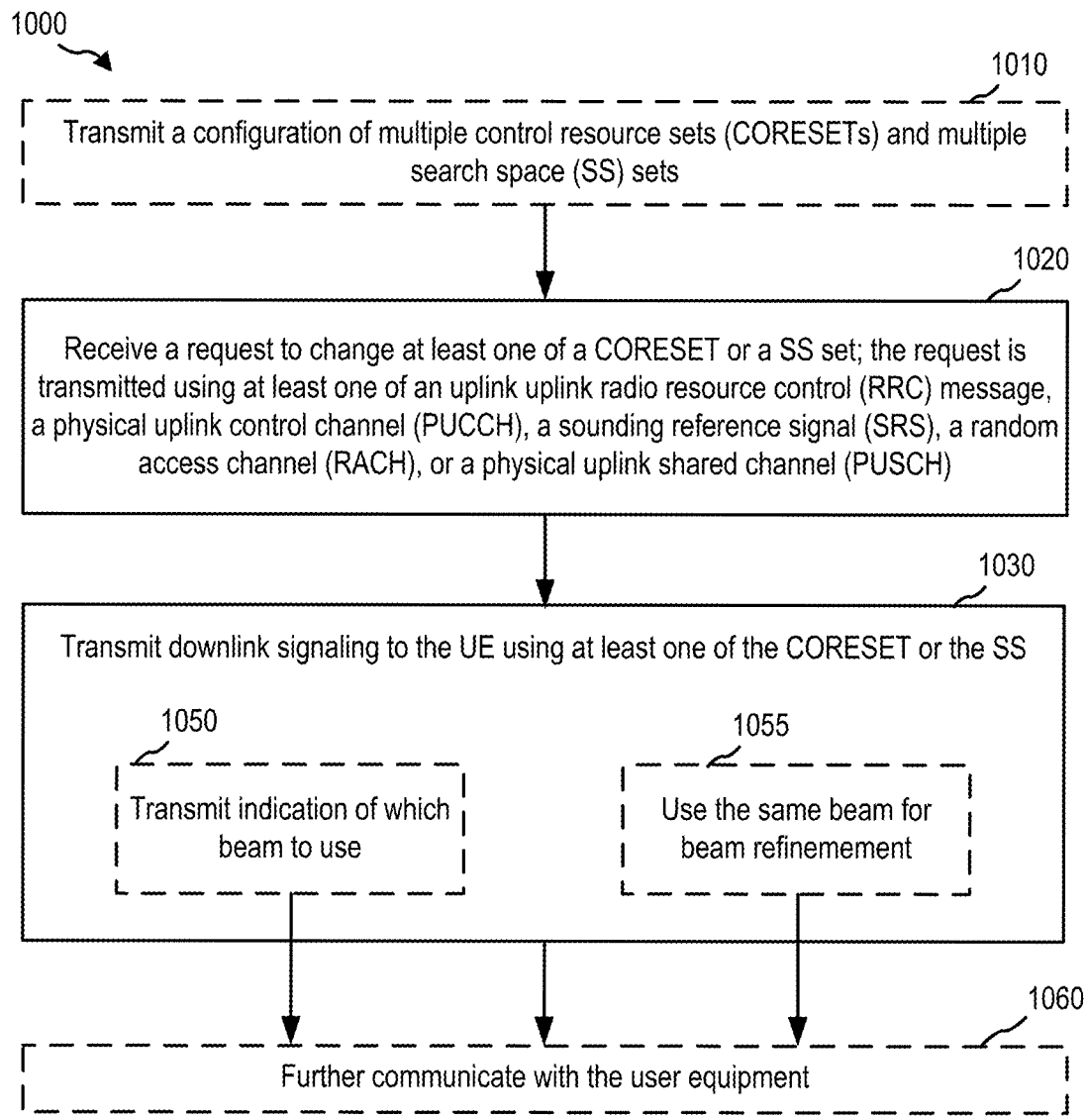
FIG. 10 is a flow diagram illustrating an example of a method performed, for example, by a base station, in accordance with various aspects of the present disclosure.

FIG. 10 is a flow diagram illustrating an example of a method 1000 performed, for example, by a base station, in accordance with various aspects of the present disclosure. The method 1000 may be performed by the base station 110, 802; the processing system, which may include the memory 242 and which may be the entire base station 110 or a component of the base station 110, such as the TX processor 220, the RX processor 238, the TX MIMO processor 230, the MIMO detector 236, the modulator/demodulator 232, the antenna 234, and/or the controller/processor 240. Optional aspects are illustrated with a dashed line. The method 1000 may enable the base station to transmit downlink signaling based on a received request.

At block 1010, the base station may transmit a configuration of multiple CORESETs and multiple SS sets to a UE. The configuration may include aspects described in connection with 803 in FIG. 8. The multiple CORESETs and multiple SS sets may also be activated by the base station 802. The activation may include aspects described in connection with 805 in FIG. 8. The base station 802 may also configure the UE 804 to retransmit a request if a reply is not received from the base station 802 up to a threshold number of attempts.

At block 1020, the base station may receive a request for a change for at least one of a CORESET or a SS set from the UE. The change may comprise at least one of: an activation of the at least one of the CORESET or the SS set, a deactivation of the at least one of the CORESET or the SS set, or an adjustment for the at least one of the CORESET or the SS set, etc. The request may be transmitted using at least one of an uplink RRC message, a PUCCH, a SRS, a RACH, or a PUSCH. In some examples, the request may be for more than one CORESET and/or more than one SS set. The request may include aspects described in connection with the request 807 in FIG. 8. In some aspects, the request may be multiplexed with a SR, a CSI related signal such as a CSI reporting signal, or a HARQ ACK signal.

In some aspects, the request indicates at least one CORESET of the multiple CORESETs or at least one SS set of the multiple SS sets. In some aspects, the request indicates a duration associated with the request. The duration may be at least one of a number of occurrences of the CORESET or the SS set or a length of time. The request may specify one or more of: 1) one or more preconfigured CORESET(s)/SS set(s) that may be previously indicated to the UE 804 in RRC signaling, 2) the validity of the CORESET(s)/SS set(s) including one or more of a number of occurrences, how long the CORESET(s)/SS set(s) last (unspecified may be treated as indefinite), 3) specific CORESET/SS parameters such as an aggregation level, a physical downlink control channel (PDCCH) candidate, or a number of PDCCH candidates, 4) a desired transmission configuration indicator (TCI) state for the PDCCH, or 5) a desired number of repetitions for the PDCCH. In some aspects, the base station 802 may change configurations of the CORESET(s)/SS set(s) based on the requested CORESET/SS parameters. The request may be for DCI for one or more of an uplink dynamic grant, downlink beam training, or a downlink dynamic grant. For example, the UE 804 may request DCI for uplink dynamic grants only, may request DCI for uplink dynamic grants and downlink beam training, or may request DCI for uplink dynamic grants and downlink dynamic grants.

At block 1030, the base station may transmit downlink signaling to the UE using at least one of the CORESET or the SS. The downlink signaling may include aspects described in connection with 815 in FIG. 8. The downlink signaling may include transmission of the PDCCH in accordance with the request.

At block 1050, the base station transmits an indication of which beam to use if the UE transmitted one or more repetitions of the request using different transmission beams. In some aspects, the base station 802 may previously configure the UE 804 to transmit the one or more repetitions of the request using different transmission beams.

At block 1055, the base station performs beam refinement using the same transmission beam that the UE used to transmit one or more repetitions of the request if the UE used the same transmission beam in the one or more repetitions. In some aspects, the base station 802 may previously configure the UE 804 to transmit the one or more repetitions of the request using the same transmission beam. In some aspects, the base station 802 may perform reception beam refinement based on the one or more repetitions. In some aspects, the base station 802 may configure the UE 804 to perform an SRS beam refinement procedure before transmitting the request or after transmitting the request and may perform beam refinement based on the SRS beam refinement procedure.

At block 1060, the base station may continue to communicate with the user equipment. The communication may include aspects described in connection with 817 in FIG. 8. The communication may be based on the PDCCH transmitted at 1030.

Aspects of the present disclosure may improve UE power consumption and reduce uplink and downlink traffic by enabling periodic CORESET(s)/SS set(s) for UEs having more flexible room for latency (e.g., reduced capability UEs with larger latency requirement) and meeting changing resource needs for the UE. As described above, a UE may send a request to a base station for a change for CORESET(s) and/or SS set(s). The request may identify one or more CORESETs and/or one or more SS sets that were configured for the UE. For example, the UE may be configured with a periodic CORESET(s)/SS set(s) with a longer periodicity (e.g., sparser in time). The longer periodicity may enable the UE to save power by not monitoring for PDCCH between the CORESET(s)/SS set(s). When a data is to be transmitted by the UE during this non-monitoring period (or when the UE is not configured with any CORESET(s)/SS set(s)), the UE may send a message to the base station to request a change for a CORESET(s)/SS set(s) (e.g., a CORESET/SS set to be activated, deactivated, modified, etc.) for the UE. The UE may send the request through a scheduling request (SR), RACH, and/or RRC signaling, etc. Based on the UE's request, the base station may communicate with the UE using the new and/or modified CORESET(s)/SS set(s) in a new BWP. The UE may switch to the new BWP that comprises the new and/or modified CORESET(s)/SS set(s). Such dynamic or on-demand adjustments enable CORESET(s)/SS set(s) to be scheduled for the UE based at least in part on the uplink traffic. Following the request, the UE may determine whether to resume monitoring the previous periodic CORESET(s)/SS set(s) that has the longer periodicity. Aspects of the present disclosure may reduce UE power consumption because the UE may monitor for the PDCCH less frequently, and may also reduce the uplink traffic and downlink overhead because CORESET(s)/SS set(s) may be used for the UE in response to the UE request.

Figure 11:
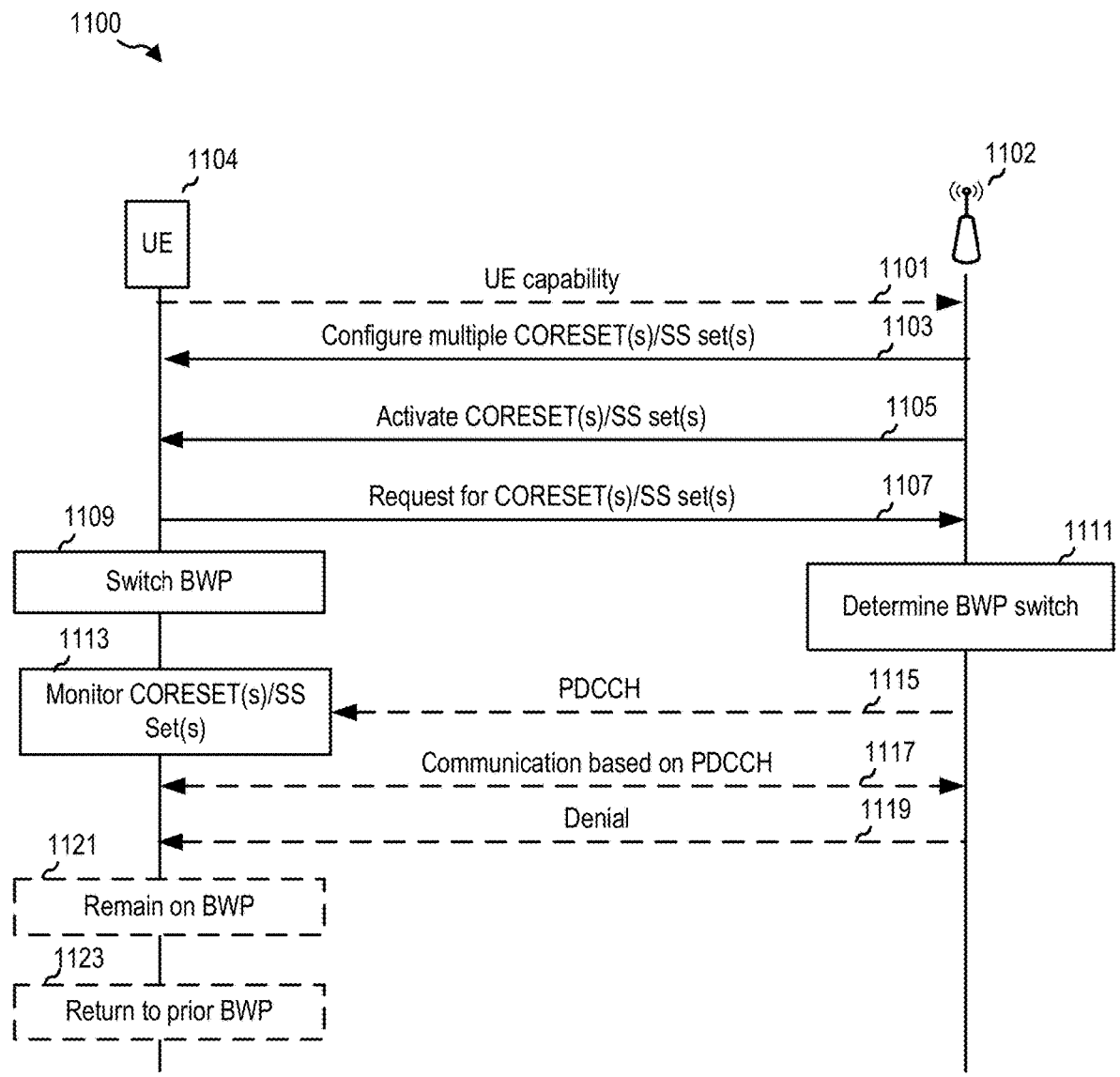
FIG. 11 is a call flow diagram illustrating an example communication flow between a user equipment (UE) and a base station, in accordance with various aspects of the present disclosure.

FIG. 11 is a call flow diagram illustrating an example communication flow 1100 between a UE 1104 and a base station 1102, in accordance with various aspects of the present disclosure. As described, the UE 1104 may provide an implicit BWP switch based on a request 1107 for a new or modified CORESET(s)/SS set(s). In some examples, the UE's request 1107 for CORESET(s)/SS set(s) may be regarded by the network (e.g., the base station 1102) as an implicit BWP switch request from the UE 1104. The request 1107 may request that the CORESET(s) and/or SS set(s) to be activated, deactivated, modified, etc.

As illustrated at 1103, the base station 1102 may configure multiple CORESETs and SS sets for the UE 1104. Each CORESET and/or SS set may have an associated identifier (e.g., a CORESET ID or an SS set ID). At 1105, the base station 1102 may activate one or more of the CORESETs and SS sets for the UE. The UE 1104 may send a request 1107 for a specific CORESET ID and/or SS ID (e.g., CORESET ID 2, SS ID 5). In some examples, the UE may send the request 1107 in response to having uplink data to transmit. For example, during a beam refinement process, the UE 1104 may send a request for the CORESETs/SS sets to schedule the DL RS from the base station 1102. As there may be a one to one mapping for each CORESET ID and/or SS ID to each BWP per configuration, based on the requested CORESET ID and/or SS ID, the network (e.g., the base station 1102) may determine that the UE 1104 is implicitly requesting or indicating a BWP switch. For example, at 1111, the base station 1102 may determine that the UE 1104 will switch to the BWP associated with the CORESET(s)/SS set(s) indicated in the request 1107. For example, the UE's current CORESET(s)/SS set(s) configuration may be associated with a first BWP (e.g., BWP 1 in FIG. 3) and the CORESET ID and/or SS ID requested by the UE 1104 may be associated with a different BWP (e.g., BWP 2 in FIG. 3). Thus, the UE's request 1107 for changing the CORESET(s)/SS set(s) configuration may also imply the UE's request for, or indication of intent for, switching the BWP (e.g., from BWP 1 one to BWP 2).

In response to receiving the request 1107, the base station 1102 may switch to sending communication to the UE 1104 on the corresponding BWP. As illustrated at 1109, the UE 1104 may switch to the corresponding BWP (e.g., BWP 2) for monitoring for PDCCH from the base station 1102 using the requested CORESET ID and/or SS ID.

In some examples, the base station 1102 may not receive the UE's request, the base station 1102 may not be able to honor the UE's request, or the base station 1102 may determine to ignore UE's request (e.g., without explicit denial), etc. In these examples, the base station 1102 may not send the PDCCH to the UE 1104 using the new BWP and the CORESET(s) SS set(s) indicated in the request 1107. The base station 1102 may continue to send the PDCCH to the UE 1104 based on the prior BWP and/or the previously activated CORESET(s)/SS set(s). In other examples, the base station 1102 may transmit the PDCCH (e.g., PDCCH 1115) based on the requested CORESET/SS set and the implied BWP. However, the UE 1104 may not receive the PDCCH in the corresponding BWP, or the UE 1104 may fail to decode the received PDCCH, etc.

In some examples, when the UE 1104 is unable to receive or decode the PDCCH in the requested BWP (e.g., BWP with requested CORESET ID and/or SS ID) for a preconfigured number of SS occasions and/or when the base station 1102 does not inform the UE 1104 whether the UE's request has been granted or denied, the UE 1104 may be configured to return to the prior BWP (e.g., BWP 1 from which the UE 1104 switched to BWP 2), at 1123. The number of SS occasions may be pre-configured to the UE 1104 by the base station 1102 before the UE's request for a new CORESET ID and/or SS ID (e.g., in the configuration 1103). In other examples, the number of SS occasions may be configured separately from the CORESETs/SS sets. If the base station 1102 refrained from transmitting a PDCCH to the UE 1104 on the BWP, the base station 1102 may continue to communicate with the UE 1104 on the prior BWP. Therefore, the UE 1104 may receive the PDCCH from the base station 1102 after returning to the prior BWP.

In still other examples, the network (e.g., base station 1102) may explicitly deny the UE's request, such as sending a denial message 1119 to the UE 1104. In some examples, the base station 1102 may send the denial message 1119 to the UE 1104 at a first PDCCH occasion for the requested CORESET(s)/SS set(s) on the new BWP. In some examples, the UE 1104 may stay on the new BWP, at 1121, after receiving the denial message 1119. In other examples, the UE 1104 may return to the prior BWP, at 1123, after receiving the denial message 1119.

For example, after sending the request 1107, the UE 1104 may start monitoring for the PDCCH, at 1113, in the corresponding BWP for the requested CORESET(s)/SS set(s). The UE 1104 may then receive a message from the base station 1102 (e.g., PDCCH 1115) indicating that the base station 1102 does not grant the UE's request. Depending on the circumstances or a configuration, the UE 1104 may choose to stay on the new BWP, or it may return to the previous BWP. In some examples, the base station 1102 may configure the UE 1104 to remain on the new BWP if the request is denied by the base station 1102. In other examples, the base station 1102 may configure the UE 1104 to return to the prior BWP if the request is denied by the base station 1102. The configuration may be transmitted, for example, or may be sent with the denial message 1119. In some examples, it may not be desirable for the UE 1104 to switch back to the originating BWP as the base station 1102 may be able to grant the UE's request after a number of cycles and it may take time for the UE 1104 to switch back to the prior BWP (e.g., it creates additional time gaps in communication). In other examples, it may be desirable for the UE 1104 to switch back to the prior BWP as the new BWP may be overloaded at the time.

In other examples, the base station 1102 may grant the UE's request and/or may communicate based on the requested CORESET(s)/SS set(s) and the implied BWP. For example, the base station 1102 may send a reply to the request 1107 accepting the request, activating the CORESET/SS set, deactivating the CORESET/SS set, modifying the CORESET/SS set, etc. The base station 1102 may send the PDCCH 1115 to the UE 1104 in the requested CORESET/SS set on the BWP to which the UE 1104 switches, at 1109. In some examples, the PDCCH may allocate resources for communication between the UE 1104 and the base station 1102. At 1117, the UE 1104 may communicate with the base station 1102 based on the resources allocated in the PDCCH 1115.

At a later time, the base station 1102 may deactivate the requested CORESET(s)/SS set(s) for the UE 1104. As an example, the base station 1102 may deactivate the CORESET/SS set after the UE 1104 has finished a transmission. The UE 1104 may decide, or the base station 1102 may indicate to the UE 1104, whether to continue to stay on the new BWP implied in the request 1107, or return to the prior BWP. This may depend on various factors as described above. In some examples, it may be beneficial for the UE 1104 to stay on the new BWP, and in other examples, it may be more beneficial for the UE 1104 to return to the originating BWP. In some examples, the base station 1102 may indicate to the UE 1104 to switch back to the originating BWP after a certain period (or after a timer expires), or switch to another BWP, such as one with less traffic. The UE 1104 may remain on the new BWP, at 1121, following the deactivation. The UE 1104 may return to the prior BWP, at 1123, following the deactivation. The base station 1102 may set rules for whether to return through a configuration for the UE 1104, for example, at 1103. Following deactivation, the base station 1102 may communicate with the UE 1104 using the originating BWP, or it may communicate with the UE 1104 using the new BWP.

When a UE 1104 sends the request 1107, there may be an added amount of time between the request 1107 and the time that the UE 1104 begins monitoring the CORESET/SS set, at 1113, due to the BWP switch performed by the UE 1104, at 1109. The amount of time for the UE 1104 to start monitoring for the PDCCH after the request may depend on the UE's capability (e.g., processing speed) for the BWP switch. The UE 1104 may inform the base station 1102 about the time it may start monitoring the PDCCH, for example, by sending the UE capability 1101, so that the base station 1102 may schedule the transmission of the PDCCH 1115 more accurately. When the UE's request 1107 involves BWP switching, the base station 1102 may extend a time period for sending the PDCCH 1115 based on a BWP switch gap time. For example, it may take 10 ms for the UE 1104 to start monitoring for the PDCCH after sending the request to the base station 1102, and it may take 3 ms for the UE 1104 to switch from one BWP to another BWP. In this case, the UE 1104 may need 13 ms in total to start PDCCH monitoring, at 1113, after sending the request 1107. The UE 1104 may indicate this switch gap time to the base station 1102, at 1101, so that the base station 1102 may schedule a more accurate PDCCH transmission 1115.

Figure 12:
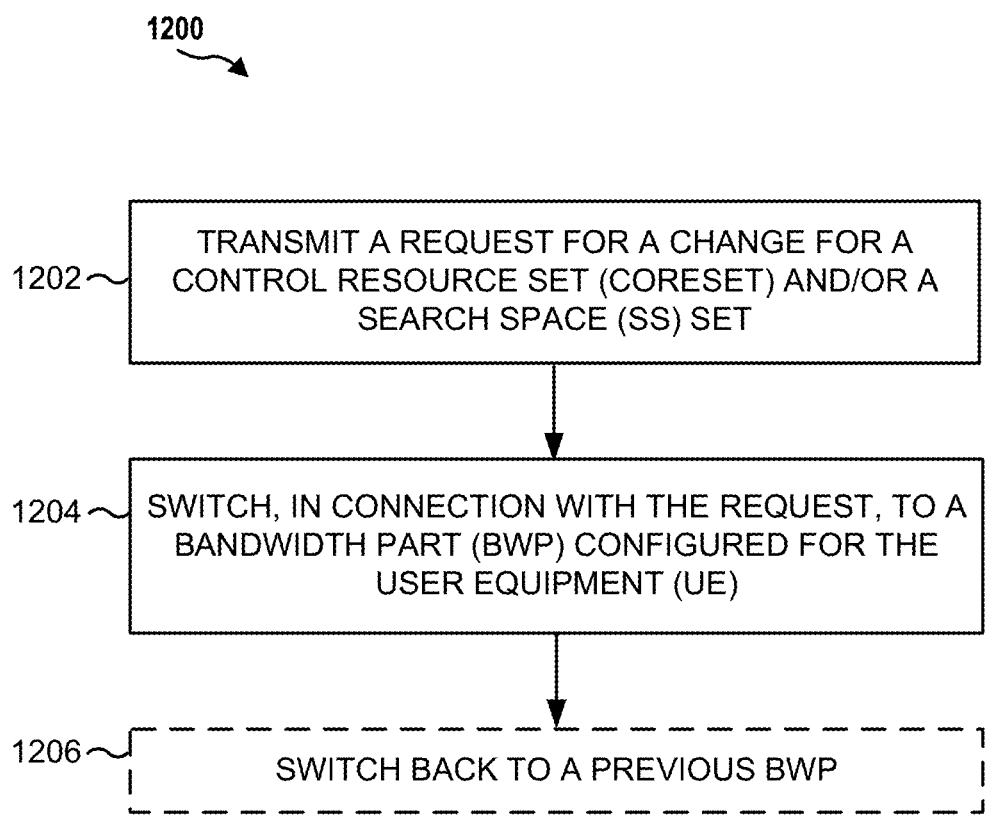
FIG. 12 is a flow diagram illustrating an example of a method performed, for example, by a user equipment (UE), in accordance with various aspects of the present disclosure.

FIG. 12 is a flow diagram illustrating an example of method 1200 performed, for example, by a user equipment (UE), in accordance with various aspects of the present disclosure. The method 1200 may be performed by the UE 120, 1104; a processing system, which may include the memory 282 and which may be the entire UE 120 or a component of the UE 120, such as the TX processor 264, the RX processor 258, the demodulator/modulator 254, antenna 252, MIMO detector 256, TX MIMO processor 266, and/or the controller/processor 280. Optional aspects are illustrated with a dashed line. The method 1200 may enable the UE to switch to a new BWP based on the UE's request for a new or changing at least one of a CORESET or a SS set. After the UE switches to the new BWP, the UE may return to the originating BWP after transmission or after receiving no response from the base station. The UE may also stay on the new BWP depending on the circumstances, such as based on indications from the base station. Further, the time between the UE's request and the UE's monitoring for the requested CORESET or a SS set may be extended by the UE's BWP switch time. In some examples, the method 1200 may include aspects described in connection with the UE 1104 in FIG. 11.

At block 1202, the UE may transmit a request for a change for a CORESET and/or a SS set. The change may comprise an activation of the CORESET and/or the SS set, a deactivation of the CORESET and/or the SS set, and/or an adjustment for the CORESET and/or the SS set, etc. In some examples, the request may be for more than one CORESET and/or more than one SS set. The request may include aspects described in connection with the request 1107 in FIG. 11.

At block 1204, the UE may switch, in connection with the request, to a BWP configured for the UE, and the UE may monitor the CORESET and/or the SS set in the BWP. For example, the UE's request may include a CORESET ID or a SS set ID, such that the UE may switch to the BWP associated with the CORESET ID or the SS set ID. After the UE switches to the new BWP, the UE may monitor for a PDCCH on the BWP. When the UE monitors for the CORESET or the SS set on the BWP, the period between the UE sending the request and starting to monitor for the CORESET or the SS set may be based on a BWP switch time for switching to the BWP. In addition, the UE may signal, prior to transmitting the request, a UE capability to the base station that indicates the BWP switch time.

The UE may receive a denial in response to the request, and may remain on the new BWP after the denial. For example, the UE may receive, prior to transmitting the request, a configuration that indicates whether to remain on the BWP following the request. Thus, when a UE receives a denial in response to the request, the UE may remain on the BWP. In addition, after a deactivation of the CORESET or the SS set (e.g., after the UE has finished transmission), the UE may also remain on the BWP. For example, the UE may receive, prior to transmitting the request, a configuration that indicates whether to remain on the BWP following a deactivation of the CORESET or the SS set, and the UE may remain on the BWP following the deactivation of the CORESET or the SS set based on the configuration.

At block 1206, the UE may switch back to a previous BWP under certain circumstances. In one example, the UE is configured to switch back to the previous BWP if the PDCCH is not received for a number of SS set occasions and/or a duration of time. The UE may receive the number of SS set occasions and/or the duration of time prior to transmitting the request. In other examples, the UE may receive a denial in response to the request, and switch back to the previous BWP in response to receiving the denial. For example, the UE may receive, prior to transmitting the request, a configuration that indicates whether to remain on the BWP following the request. Thus, when a UE receives a denial in response to the request, the UE may switch to a prior BWP in response to the denial based on the configuration. In other examples, the UE may switch back to a previous BWP in response to a deactivation of the CORESET of the SS set (e.g., after the UE has finished transmission). For example, the UE may receive, prior to transmitting the request, a configuration that indicates whether to remain on the BWP following a deactivation of the CORESET or the SS set, and the UE may switch to the prior BWP following the deactivation of the CORESET or the SS set based on the configuration.

Figure 13:
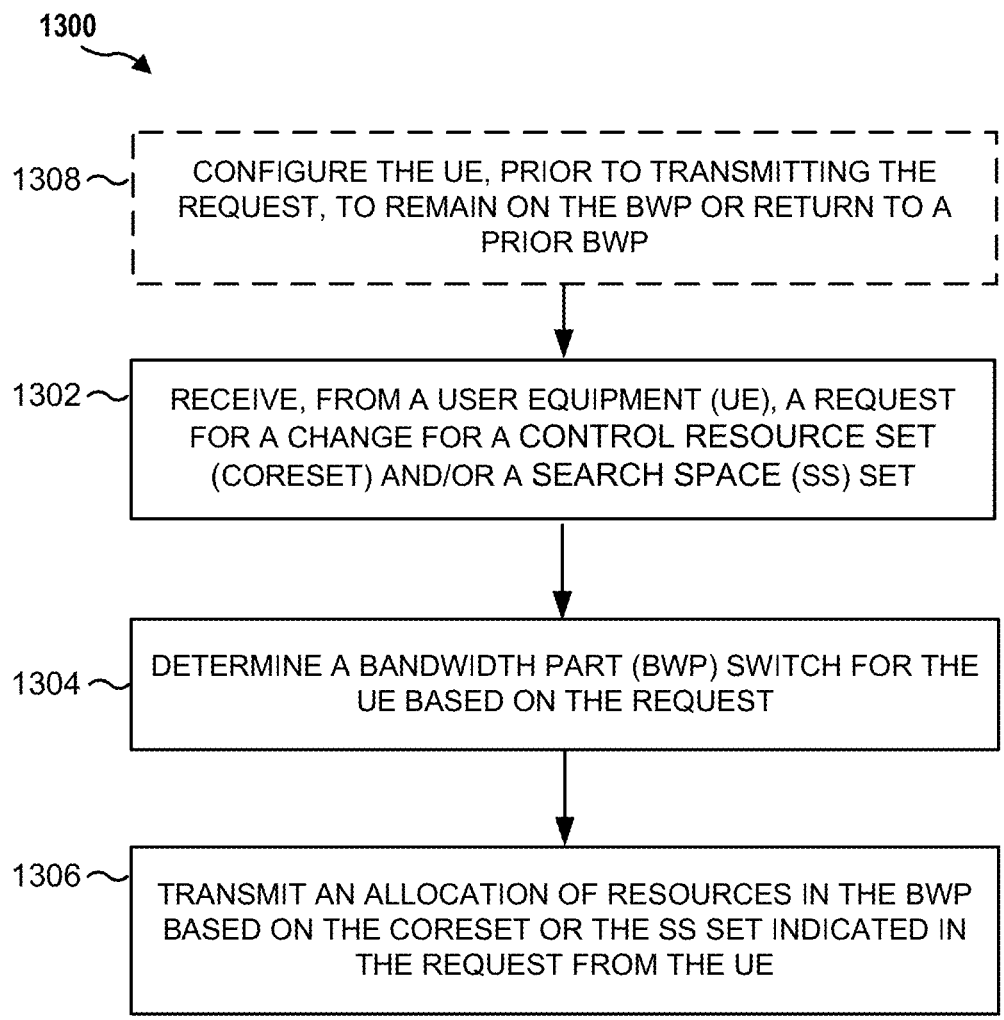
FIG. 13 is a flow diagram illustrating an example of a method performed, for example, by a base station, in accordance with various aspects of the present disclosure.

FIG. 13 is a flow diagram illustrating an example of a method 1300 performed, for example, by a base station, in accordance with various aspects of the present disclosure. The method 1300 may be performed by the base station 110, 1102; the processing system, which may include the memory 242 and which may be the entire base station 110 or a component of the base station 110, such as the TX processor 220, the RX processor 238, the TX MIMO processor 230, the MIMO detector 236, the modulator/demodulator 232, the antenna 234, and/or the controller/processor 240. Optional aspects are illustrated with a dashed line. The method 1300 may enable the base station to determine a BWP switch for a UE based on the UE's request for a change for a CORESET and/or a SS set. The base station may then transmit an allocation of resources in the BWP based on the CORESET and/or the SS set indicated in the request from the UE. In some examples, the method 1300 may include aspects described in connection with the base station 1102 in FIG. 11.

At block 1302, the base station may receive, from a UE, a request for a change for a CORESET and/or a SS set. The change may comprise an activation of the CORESET and/or the SS set, a deactivation of the CORESET and/or the SS set, and/or an adjustment for the CORESET and/or the SS set, etc. The request may include aspects described in connection with the request 1107 in FIG. 11.

At block 1304, the base station may determine a BWP switch for the UE based on the UE's request. For example, the request from the UE may include a CORESET ID or a SS set ID. The base station may determine whether the UE may switch to the BWP associated with the CORESET ID or the SS set ID requested. If the base station is refraining from transmitting a PDCCH to the UE on the BWP, the base station may communicate with the UE on a previous BWP.

The determination may include aspects described in connection with 1111 in FIG. 11.

At block 1306, the base station may transmit an allocation of resources in the BWP based on the CORESET and/or the SS set indicated in the request from the UE. In some examples, the base station may transmit a PDCCH based on the CORESET or the SS set on the BWP. The period between receiving the request and transmitting the PDCCH may be based on a BWP switch time for switching to the BWP. The base station may receive, prior to transmitting the request, an indication of a UE capability for the BWP switch time from the UE.

At block 1308, the base station may configure the UE, prior to receiving the request, with various configuration(s) and condition(s) that may enable the UE to determine whether to stay on the new BWP configured for the UE or return to the originating BWP. In some examples, the base station may configure the UE with a number of SS set occasions or a duration of time for the UE to return to the previous BWP following the request. In other examples, the base station may configure the UE, prior to transmitting the request, to remain on the BWP or return to a prior BWP following a denial of the request. In still other examples, the base station may configure the UE, prior to transmitting the request, to remain on the BWP or to switch to a prior BWP following a deactivation of the CORESET or the SS set. If the base station transmits a denial in response to the UE's request, or following the deactivation of the CORESET or the SS set based on the configuration, the base station may communicate with the UE on the prior BWP and/or the new BWP. In some cases, it may not be desirable for the UE to switch back to the originating BWP, as the base station may be able to grant the UE's request after certain cycles and it may take time for the UE to switch BWP (e.g., it creates additional time gaps in communication). In other cases, it may be desirable for the UE to switch back to the originating BWP, as the new BWP may be overloaded at the time.

Implementation examples are described in the following numbered clauses.

1. A method of wireless communications by a user equipment (UE), comprising:
    transmitting a request for action for at least one control resource set (CORESET) and associated search space set, the action comprises configuring, activating, and/or deactivating the at least one CORESET and associated search space, the at least one CORESET comprising a dynamic CORESET with a predefined number of search space occasions or a semi-static CORESET; and
    communicating in accordance with the request.
2. The method of clause 1, further comprising receiving radio resource control (RRC) signaling indicating a plurality of preconfigured candidate CORESETs and associated candidate search spaces, in which the request is for at least one of the preconfigured candidate CORESETs and associated search spaces.
3. The method of clause, further comprising receiving radio resource control (RRC) signaling mapping CORESETs to occasions, in which the request comprises implicit signaling including a first transmission during a random access channel (RACH) occasion or a second transmission during a scheduling request (SR) occasion.
4. The method of any of the preceding clauses 1-3, further comprising starting monitoring for the at least one CORESET a predefined time after transmitting the request, the predefined time being network configured, requested by the UE, or based on a UE capability.
5. The method of any of the preceding clauses 1-4, further comprising receiving a PDCCH (physical downlink control channel) in a requested search space, the receiving comprising receiving an acknowledgment of the request.
6. The method of any of the preceding clauses 1-5, further comprising stopping monitoring for the at least one CORESET after failing to decode a predetermined number of PDCCHs (physical downlink control channels) after transmitting the request, in which the predetermined number of PDCCHs begin a predetermined time after transmitting the request.
7. The method of any of the preceding clauses 1-6, further comprising:
    receiving a deny message in a first search space occasion after transmitting the request; and
    stopping monitoring additional search space occasions related to the request in response to receiving the deny message.
8. The method of any of the preceding clauses 1-7, further comprising deactivating the at least one CORESET and associated search space set based on a first set of parameters in the request or a second set of parameters in a first downlink control information (DCI) message received after transmitting the request, the first set of parameters or the second set of parameters defining a validity of the CORESET, the validity including a number of occurrences of the at least one CORESET and associated search space.
9. The method of any of the preceding clauses 1-7, further comprising deactivating the at least one CORESET and associated search space set based on explicit signaling comprising a UE request including a media access control-control element (MAC-CE).
10. The method of any of the preceding clauses 1-7, further comprising deactivating the at least one CORESET and associated search space set based on explicit signaling comprising a network indication received in a grant including downlink control information (DCI) or downlink control information (DCI) without a grant, the DCI including downlink format information (DFI) to indicate the deactivating.
11. The method of any of the preceding clauses 1-7, further comprising deactivating the at least one CORESET and associated search space set based on implicit information comprising expiration of a timer measuring physical downlink control channel (PDCCH) inactivity or a BSR (buffer status report).
12. The method of any of the preceding clauses 1-7, further comprising deactivating the at least one CORESET and associated search space set based on a configured number of occurrences when the CORESET is the dynamic CORESET.
13. The method of any of the preceding clauses 1-12, further comprising switching, in connection with the request, to a bandwidth part (BWP) configured for the UE.
14. The method of any of the preceding clauses 1-13, in which the request includes a CORESET ID or a search space set ID, and the BWP configured for the UE is associated with the CORESET ID or the search space set ID.
15. The method of any of the preceding clauses 1-14, further comprising:

monitoring for a physical downlink control channel (PDCCH) on the BWP; and switching back to a previous BWP if the PDCCH is not received for at least one of a number of search space set occasions or a duration of time, according to a configuration for the number of search space set occasions or the duration of time prior to transmitting the request.

16. The method of any of the preceding clauses 1-15, further comprising:

receiving a denial in response to the request; and switching back to a previous BWP in response to receiving the denial; or remaining on the BWP in response to receiving the denial.

17. The method of any of the preceding clauses 1-16, further comprising:

receiving, prior to transmitting the request, a configuration that indicates whether to remain on the BWP following the request;

receiving a denial in response to the request; and remaining on the BWP or switching to a prior BWP in response to the denial, based on the configuration.

18. The method of any of the preceding clauses 1-17, further comprising:

switching back to a previous BWP in response to a deactivation of the CORESET of the search space set; or remaining on the BWP after a deactivation of the CORESET or the search space set.

19. The method of any of the preceding clauses 1-17, further comprising:

receiving, prior to transmitting the request, a configuration that indicates whether to remain on the BWP following a deactivation of the CORESET or the search space set; and remaining on the BWP or switching to a prior BWP following the deactivation of the CORESET or the search space set based on the configuration.

20. The method of any of the preceding clauses 1-19, further comprising monitoring for the CORESET or the search space set on the BWP, in which a period between the UE sending the request and starting to monitor for the CORESET or the search space set is based, at least in part, on a BWP switch time for switching to the BWP.

21. The method of any of the preceding clauses 1-20, in which the request is transmitted using at least one of an uplink radio resource control (RRC) message, a physical uplink control channel (PUCCH), a sounding reference signal (SRS), a random access channel (RACH), or a physical uplink shared channel (PUSCH).

22. The method of any of the preceding clauses 1-21, in which the request indicates a duration or a number of occurrences of the CORESET or the search space set associated with the request.

23. The method of any of the preceding clauses 1-22, in which the request indicates one or more parameters for the CORESET or the search space set, the one or more parameters including at least one of:

an aggregation level, a physical downlink control channel (PDCCH) candidate, a number of PDCCH candidates, a transmission configuration indicator (TCI) state for the PDCCH, or a repetition for the PDCCH.

24. The method of any of the preceding clauses 1-23, in which the request is multiplexed with a scheduling request (SR), channel state information (CSI), or hybrid automatic repeat request (HARD) feedback from the UE.

25. The method of any of the preceding clauses 1-24, further comprising retransmitting the request in response to a reply not being received from a base station, the UE transmitting the request up to a configured threshold number of attempts.

26. The method of any of the preceding clauses 1-25, further comprising:

receiving a configuration to transmit one or more repetitions of the request; and transmitting the one or more repetitions of the request based on the configuration, the UE transmitting the request and the one or more repetitions of the request using a same transmission beam.

27. The method of any of the preceding clauses 1-26, in which the same transmission beam is based on a prior sounding reference signal indicator (SRI) or a prior uplink transmission beam.

28. The method of any of the preceding clauses 1-25, further comprising:

receiving a configuration to transmit one or more repetitions of the request; and transmitting the one or more repetitions of the request based on the configuration, the UE transmitting the request and the one or more repetitions of the request each using a different transmission beam.

29. The method of any of the preceding clauses 1-28, further comprising performing a sounding reference signal (SRS) beam refinement procedure before transmitting the request or after transmitting the request.

30. The method of any of the preceding clauses 1-29, further comprising receiving, prior to transmitting the request, a configuration to perform the SRS beam refinement procedure in connection with transmitting the request.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:
  transmitting a request for action for at least one control resource set (CORESET) and associated search space set, the action comprises activating, and/or deactivating the at least one CORESET and associated search space, the at least one CORESET comprising a dynamic CORESET with a predefined number of search space occasions or a semi-static CORESET;
  communicating in accordance with the request; and
  stopping monitoring for the at least one CORESET after failing to decode a predetermined number of PDCCHs (physical downlink control channels) after transmitting the request, in which the predetermined number of PDCCHs begin a predetermined time after transmitting the request.

2. A method of wireless communications by a user equipment (UE), comprising:
  transmitting a request for action for at least one control resource set (CORESET) and associated search space set, the action comprises activating, and/or deactivating the at least one CORESET and associated search space, the at least one CORESET comprising a dynamic CORESET with a predefined number of search space occasions or a semi-static CORESET;
  communicating in accordance with the request;
  switching, in connection with the request, to a bandwidth part (BWP) configured for the UE;
  monitoring for a physical downlink control channel (PDCCH) on the BWP; and
  switching back to a previous BWP if the PDCCH is not received for at least one of a number of search space set occasions or a duration of time, according to a configuration for the number of search space set occasions or the duration of time prior to transmitting the request.

3. A method of wireless communications by a user equipment (UE), comprising:
  transmitting a request for action for at least one control resource set (CORESET) and associated search space set, the action comprises activating, and/or deactivating the at least one CORESET and associated search space, the at least one CORESET comprising a dynamic CORESET with a predefined number of search space occasions or a semi-static CORESET;
  communicating in accordance with the request;
  receiving a configuration to transmit one or more repetitions of the request;
  transmitting the one or more repetitions of the request based on the configuration, the UE transmitting the request and the one or more repetitions of the request using a same transmission beam; and
  wherein the request is transmitted using at least one of an uplink radio resource control (RRC) message, a physical uplink control channel (PUCCH), a sounding reference signal (SRS), a random access channel (RACH), or a physical uplink shared channel (PUSCH).

4. The method of claim 3, in which the same transmission beam is based on a prior sounding reference signal indicator (SRI) or a prior uplink transmission beam.

* * * * *